US012662030B2

(12) United States Patent
Karges et al.

(10) Patent No.: US 12,662,030 B2
(45) Date of Patent: Jun. 23, 2026

(54) SEAT ASSEMBLY, CLIP, AND METHOD OF MANUFACTURE

(71) Applicant: Lear Corporation, Southfield, MI (US)

(72) Inventors: Mark Karges, Macomb, MI (US); Michelle A. Brudzynsky, Farmington Hills, MI (US); Joshua Hallock, Warren, MI (US)

(73) Assignee: LEAR CORPORATION, Southfield, MI (US)

( * ) Notice: Subject to any disclaimer, the term of this patent is extended or adjusted under 35 U.S.C. 154(b) by 145 days.

(21) Appl. No.: 18/629,363

(22) Filed: Apr. 8, 2024

(65) Prior Publication Data

US 2024/0416810 A1 Dec. 19, 2024

Related U.S. Application Data

(60) Provisional application No. 63/508,301, filed on Jun. 15, 2023.

(30) Foreign Application Priority Data

Nov. 21, 2023 (DK) .............................. PA202370583

(51) Int. Cl.
*B60N 2/58* (2006.01)
(52) U.S. Cl.
CPC .................................. *B60N 2/5825* (2013.01)
(58) Field of Classification Search
CPC .......................... B60N 2/5825; B60N 2/6027
See application file for complete search history.

(56) References Cited

U.S. PATENT DOCUMENTS

| | | | |
|---|---|---|---|
| 1,621,008 A | 3/1927 | Fricker |
| 2,130,935 A | 9/1938 | Thompson |
| 2,188,995 A | 2/1940 | Avery et al. |
| 2,630,938 A | 3/1953 | Burnett |
| 2,630,968 A | 3/1953 | Morris |
| 3,155,363 A | 11/1964 | Lohr |
| 3,309,052 A | 3/1967 | Borisof |
| 3,315,283 A | 4/1967 | Larsen |
| 3,630,572 A | 12/1971 | Homier |
| 3,689,620 A | 9/1972 | Miyazaki et al. |
| 3,733,658 A | 5/1973 | Mitchell |
| 3,794,378 A | 2/1974 | Haslam et al. |
| 3,861,747 A | 1/1975 | Diamond |

(Continued)

FOREIGN PATENT DOCUMENTS

| | | |
|---|---|---|
| AU | 2006227668 A1 | 9/2006 |
| AU | 2003296088 B2 | 9/2008 |

(Continued)

OTHER PUBLICATIONS

Search Report dated Oct. 6, 2024 for related Appln. No. GB2405709.3; 2 Pages.

(Continued)

*Primary Examiner* — Rodney A Bonnette
(74) *Attorney, Agent, or Firm* — ALSTON & BIRD LLP

(57) ABSTRACT

A clip, a seat assembly, and a method of manufacture. The clip is disposed in a cushion. The cushion may comprise a filament mesh structure. The clip has at least one barb that secures the clip to the cushion and at least one retention feature that secures a trim cover to the clip.

20 Claims, 7 Drawing Sheets

(56) References Cited

U.S. PATENT DOCUMENTS

| | | | |
|---|---|---|---|
| 3,961,823 A | 6/1976 | Caudill, Jr. | |
| 4,012,249 A | 3/1977 | Stapp | |
| 4,031,579 A | 6/1977 | Larned | |
| 4,264,556 A | 4/1981 | Kumar et al. | |
| 4,287,657 A | 9/1981 | Andre et al. | |
| 4,396,823 A | 8/1983 | Nihei et al. | |
| 4,476,594 A | 10/1984 | McLeod | |
| 4,563,387 A | 1/1986 | Takagi et al. | |
| 4,663,211 A | 5/1987 | Kon | |
| 4,751,029 A | 6/1988 | Swanson | |
| 4,786,351 A | 11/1988 | Elliott et al. | |
| 4,859,516 A | 8/1989 | Yamanaka et al. | |
| 4,860,402 A | 8/1989 | Dichtel | |
| 4,876,135 A | 10/1989 | McIntosh | |
| 4,881,997 A | 11/1989 | Hatch | |
| 4,900,377 A | 2/1990 | Redford et al. | |
| 4,913,757 A | 4/1990 | Yamanaka et al. | |
| 4,933,224 A | 6/1990 | Hatch | |
| 4,952,265 A | 8/1990 | Yamanaka et al. | |
| 4,953,770 A | 9/1990 | Bond, Sr. | |
| 5,003,664 A | 4/1991 | Wong | |
| 5,007,676 A | 4/1991 | Lien | |
| 5,016,941 A | 5/1991 | Yokota | |
| 5,051,226 A | 9/1991 | Brustad et al. | |
| 5,092,381 A | 3/1992 | Feijin et al. | |
| 5,095,592 A | 3/1992 | Doerfling | |
| 5,313,034 A | 5/1994 | Grimm et al. | |
| 5,378,296 A | 1/1995 | Vesa | |
| 5,381,922 A | 1/1995 | Gladman et al. | |
| 5,405,178 A | 4/1995 | Weingartner et al. | |
| D364,269 S | 11/1995 | Sabosky | |
| 5,464,488 A | 11/1995 | Servin | |
| 5,464,491 A | 11/1995 | Yamanaka | |
| 5,482,665 A | 1/1996 | Gill | |
| 5,492,662 A | 2/1996 | Kargol et al. | |
| 5,494,627 A | 2/1996 | Kargol et al. | |
| 5,536,341 A | 7/1996 | Kelman | |
| 5,551,755 A | 9/1996 | Lindberg | |
| 5,569,641 A | 10/1996 | Smith | |
| 5,586,807 A | 12/1996 | Taggart | |
| 5,587,121 A | 12/1996 | Vesa | |
| 5,605,373 A | 2/1997 | Wildern, IV et al. | |
| 5,620,759 A | 4/1997 | Insley et al. | |
| 5,622,262 A | 4/1997 | Sadow | |
| 5,639,543 A | 6/1997 | Isoda et al. | |
| 5,669,129 A | 9/1997 | Smith et al. | |
| 5,669,799 A | 9/1997 | Moseneder et al. | |
| 5,679,296 A | 10/1997 | Kelman et al. | |
| 5,685,050 A | 11/1997 | Murasaki | |
| 5,715,581 A | 2/1998 | Akeno | |
| 5,733,825 A | 3/1998 | Martin et al. | |
| 5,788,332 A | 8/1998 | Hettinga | |
| 5,811,186 A | 9/1998 | Martin et al. | |
| 5,819,408 A | 10/1998 | Catlin | |
| 5,833,321 A | 11/1998 | Kim et al. | |
| 5,966,783 A | 10/1999 | Genereux et al. | |
| 6,010,766 A | 1/2000 | Braun et al. | |
| 6,057,024 A | 5/2000 | Mleziva et al. | |
| 6,063,317 A | 5/2000 | Carroll, III | |
| 6,131,220 A | 10/2000 | Morimura | |
| 6,272,707 B1 | 8/2001 | Robrecht et al. | |
| 6,283,552 B1 | 9/2001 | Halse et al. | |
| 6,302,487 B1 | 10/2001 | Fujita et al. | |
| 6,347,790 B1 | 2/2002 | Nishibori et al. | |
| 6,378,150 B1 | 4/2002 | Minegishi et al. | |
| D461,746 S | 8/2002 | Olson et al. | |
| 6,457,218 B1 | 10/2002 | Lawrence | |
| 6,537,483 B1 | 3/2003 | Cartwright et al. | |
| 6,558,590 B1 | 5/2003 | Stewart | |
| 6,668,429 B2 | 12/2003 | Fujisawa et al. | |
| 6,766,201 B2 | 7/2004 | Von Arx et al. | |
| 6,776,201 B2 | 8/2004 | Willis | |
| 6,918,146 B2 | 7/2005 | England | |
| 6,935,698 B1 | 8/2005 | Chen | |
| D523,330 S | 6/2006 | Mattesky | |
| 7,073,230 B2 | 7/2006 | Boville | |
| 7,100,978 B2 | 9/2006 | Ekern et al. | |
| D530,192 S | 10/2006 | Becerra | |
| 7,128,371 B2 | 10/2006 | Kawasaki et al. | |
| 7,141,768 B2 | 11/2006 | Malofsky et al. | |
| 7,158,968 B2 | 1/2007 | Cardno | |
| D538,704 S | 3/2007 | Kaminski | |
| 7,290,300 B1 | 11/2007 | Khambete | |
| 7,377,762 B2 | 5/2008 | Nishibori et al. | |
| 7,427,103 B2 | 9/2008 | Weber | |
| 7,481,489 B2 | 1/2009 | Demick | |
| 7,506,939 B2 | 3/2009 | Borckschneider et al. | |
| 7,547,061 B2 | 6/2009 | Horimatsu et al. | |
| 7,549,707 B2 | 6/2009 | Brennan et al. | |
| 7,622,179 B2 | 11/2009 | Patel | |
| 7,625,629 B2 | 12/2009 | Takaoka | |
| 7,669,925 B2 | 3/2010 | Beck et al. | |
| 7,707,743 B2 | 5/2010 | Schindler et al. | |
| 7,771,375 B2 | 8/2010 | Nishibori et al. | |
| 7,837,263 B2 | 11/2010 | Booth et al. | |
| 7,866,969 B2 | 1/2011 | Ruiz et al. | |
| 7,892,991 B2 | 2/2011 | Yamanaka et al. | |
| D636,293 S | 4/2011 | Dolce et al. | |
| 7,946,649 B2 | 5/2011 | Galbreath et al. | |
| 7,993,734 B2 | 8/2011 | Takaoka | |
| 8,052,212 B2 | 11/2011 | Backendorf | |
| 8,056,263 B2 | 11/2011 | Schindler et al. | |
| 8,226,882 B2 | 7/2012 | Takaoka | |
| 8,235,462 B2 | 8/2012 | Bajic | |
| 8,240,759 B2 | 8/2012 | Hobl et al. | |
| 8,276,235 B2 | 10/2012 | Naughton | |
| 8,277,210 B2 | 10/2012 | Takaoka | |
| D677,193 S | 3/2013 | Macdonald | |
| 8,563,121 B2 | 10/2013 | Takaoka | |
| 8,563,123 B2 * | 10/2013 | Takaoka | B29C 48/12 428/218 |
| 8,568,635 B2 | 10/2013 | Takaoka | |
| 8,721,825 B2 | 5/2014 | Takaoka | |
| 8,752,902 B2 | 6/2014 | Labish | |
| 8,757,996 B2 | 6/2014 | Takaoka | |
| 8,828,293 B2 | 9/2014 | Takaoka | |
| 8,882,202 B2 | 11/2014 | Petzel et al. | |
| 8,932,692 B2 | 1/2015 | Pearce | |
| 9,004,591 B2 | 4/2015 | Murasaki et al. | |
| 9,097,921 B2 | 8/2015 | Ogasawara | |
| 9,168,854 B2 | 10/2015 | Ursino et al. | |
| 9,169,585 B2 | 10/2015 | Takaoka | |
| 9,174,404 B2 | 11/2015 | Takaoka | |
| 9,179,748 B2 | 11/2015 | Esti | |
| 9,194,066 B2 | 11/2015 | Takaoka | |
| 9,283,875 B1 | 3/2016 | Pellettiere | |
| 9,334,593 B2 | 5/2016 | Sasaki | |
| 9,434,286 B2 | 9/2016 | Klusmeier et al. | |
| 9,440,390 B2 | 9/2016 | Takaoka | |
| 9,447,522 B2 | 9/2016 | Zikeli et al. | |
| 9,456,702 B2 | 10/2016 | Miyata et al. | |
| 9,487,117 B2 | 11/2016 | Steinmeier et al. | |
| 9,528,209 B2 | 12/2016 | Takaoka | |
| 9,561,612 B2 | 2/2017 | Takaoka | |
| 9,598,803 B2 | 3/2017 | Takaoka | |
| 9,615,670 B2 | 4/2017 | Takaoka | |
| 9,616,790 B2 | 4/2017 | Stankiewicz et al. | |
| 9,617,021 B2 | 4/2017 | McCorkle et al. | |
| 9,669,744 B2 | 6/2017 | Cao et al. | |
| 9,688,007 B2 | 6/2017 | Cheng | |
| 9,708,067 B2 | 7/2017 | Wilson et al. | |
| 9,751,442 B2 | 9/2017 | Smith | |
| 9,771,174 B2 | 9/2017 | Murray | |
| D798,875 S | 10/2017 | Huang | |
| 9,789,796 B1 | 10/2017 | White | |
| 9,809,137 B2 | 11/2017 | Kheil | |
| 9,918,559 B2 | 3/2018 | Osaki | |
| 9,918,560 B2 | 3/2018 | Osaki | |
| 9,925,899 B2 | 3/2018 | Mogi et al. | |
| 9,938,649 B2 | 4/2018 | Taninaka et al. | |
| 9,970,140 B2 | 5/2018 | Taninaka et al. | |
| 10,118,323 B2 | 11/2018 | Fujita et al. | |
| 10,150,320 B2 | 12/2018 | Ellringmann et al. | |
| 10,231,511 B2 | 3/2019 | Guyan et al. | |

(56) References Cited

U.S. PATENT DOCUMENTS

| | | | |
|---|---|---|---|
| 10,233,073 B2 | 3/2019 | Takaoka | |
| 10,266,977 B2 | 4/2019 | Takaoka | |
| 10,316,444 B2 | 6/2019 | Wakui et al. | |
| 10,328,618 B2 | 6/2019 | Takaoka | |
| 10,343,565 B2 | 7/2019 | Baek et al. | |
| 10,398,236 B2 | 9/2019 | Achten et al. | |
| 10,399,848 B2 | 9/2019 | Kristo et al. | |
| 10,414,305 B2 | 9/2019 | Ishii et al. | |
| 10,421,414 B2 | 9/2019 | Townley et al. | |
| 10,457,175 B2 | 10/2019 | Lang et al. | |
| 10,501,598 B2 | 12/2019 | Baldwin et al. | |
| 10,604,040 B2 | 3/2020 | Clauser et al. | |
| 10,618,799 B2 | 4/2020 | Shah et al. | |
| 10,632,814 B2 | 4/2020 | Humer | |
| 10,730,419 B2 | 8/2020 | Low et al. | |
| 10,736,435 B2 | 8/2020 | Duncan et al. | |
| 10,744,914 B2 | 8/2020 | Baek et al. | |
| 10,750,820 B2 | 8/2020 | Guyan | |
| RE48,225 E | 9/2020 | Kheil et al. | |
| 10,780,805 B2 | 9/2020 | Kamata | |
| 10,806,272 B2 | 10/2020 | Ando et al. | |
| 10,821,862 B2 | 11/2020 | Russman et al. | |
| 10,843,600 B2 | 11/2020 | Booth et al. | |
| 10,882,444 B2 | 1/2021 | Townley et al. | |
| 10,889,071 B2 | 1/2021 | Kojima et al. | |
| D909,792 S | 2/2021 | Pound | |
| 10,934,644 B2 | 3/2021 | Taninaka et al. | |
| 11,007,761 B2 | 5/2021 | Ben-Daat et al. | |
| 11,168,421 B2 | 11/2021 | Wakui et al. | |
| 11,186,336 B2 | 11/2021 | Primeaux et al. | |
| D948,764 S | 4/2022 | Peterson | |
| 11,369,532 B2 | 6/2022 | Wilson et al. | |
| 11,383,625 B2 | 7/2022 | Voigt et al. | |
| 11,554,699 B2 | 1/2023 | Liau et al. | |
| D1,005,380 S | 11/2023 | McWilliams et al. | |
| 2001/0007166 A1 | 7/2001 | Shimamura et al. | |
| 2002/0041949 A1 | 4/2002 | Nishibori et al. | |
| 2002/0101109 A1 | 8/2002 | Stiller et al. | |
| 2002/0193221 A1 | 12/2002 | Tisi | |
| 2003/0026970 A1 | 2/2003 | Hernandez et al. | |
| 2003/0032731 A1 | 2/2003 | Oswald et al. | |
| 2003/0061663 A1 | 4/2003 | Lampel | |
| 2003/0092335 A1 | 5/2003 | Takaoko | |
| 2004/0036326 A1 | 2/2004 | Bajic et al. | |
| 2004/0099981 A1 | 5/2004 | Gerking | |
| 2004/0126577 A1 | 7/2004 | Lee et al. | |
| 2004/0142619 A1 | 7/2004 | Ueno et al. | |
| 2004/0255385 A1 | 12/2004 | England | |
| 2005/0030011 A1 | 2/2005 | Shimizu et al. | |
| 2005/0066423 A1 | 3/2005 | Hogan | |
| 2005/0198874 A1 | 9/2005 | Wurm | |
| 2005/0225155 A1 | 10/2005 | Nakahara | |
| 2005/0238842 A1 | 10/2005 | Schindzielorz et al. | |
| 2006/0068120 A1 | 3/2006 | Sreenivasan et al. | |
| 2006/0075615 A1 | 4/2006 | Khambete | |
| 2006/0116045 A1 | 6/2006 | Nishibori et al. | |
| 2006/0141221 A1 | 6/2006 | Sasaki | |
| 2006/0198983 A1 | 9/2006 | Patel | |
| 2006/0237986 A1 | 10/2006 | Brockschneider et al. | |
| 2007/0001336 A1 | 1/2007 | Nishibori et al. | |
| 2007/0057414 A1 | 3/2007 | Hartge | |
| 2007/0066197 A1 | 3/2007 | Woo et al. | |
| 2007/0134464 A1 | 6/2007 | Schindzielorz et al. | |
| 2007/0207691 A1 | 9/2007 | Cobbett Wiles et al. | |
| 2008/0018162 A1 | 1/2008 | Galbreath et al. | |
| 2008/0048474 A1* | 2/2008 | Pedde | B60N 2/5825 |
| | | | 297/228.13 |
| 2008/0099458 A1 | 5/2008 | Hilmer | |
| 2008/0102149 A1 | 5/2008 | Williams | |
| 2008/0203615 A1 | 8/2008 | Brum | |
| 2008/0252111 A1 | 10/2008 | Rothkop et al. | |
| 2008/0254281 A1 | 10/2008 | Chen et al. | |
| 2008/0258523 A1* | 10/2008 | Santin | B60N 2/5825 |
| | | | 29/428 |
| 2008/0309143 A1 | 12/2008 | Booth et al. | |
| 2009/0008377 A1 | 1/2009 | Nathan et al. | |
| 2009/0064471 A1* | 3/2009 | Santin | B60N 2/6027 |
| | | | 24/581.11 |
| 2009/0085384 A1 | 4/2009 | Galbreath et al. | |
| 2009/0108494 A1 | 4/2009 | Ito et al. | |
| 2009/0127912 A1 | 5/2009 | Galbreath et al. | |
| 2009/0152909 A1 | 6/2009 | Andersson | |
| 2009/0191779 A1 | 7/2009 | Cree | |
| 2009/0269570 A1 | 10/2009 | Takaoka | |
| 2009/0269571 A1 | 10/2009 | Takaoka | |
| 2009/0311495 A1 | 12/2009 | Squires et al. | |
| 2010/0181796 A1 | 7/2010 | Galbreath et al. | |
| 2010/0258334 A1 | 10/2010 | Akaike et al. | |
| 2011/0084537 A1 | 4/2011 | Lin et al. | |
| 2011/0252568 A1 | 10/2011 | Ramp | |
| 2011/0278902 A1 | 11/2011 | Galbreath et al. | |
| 2011/0316185 A1 | 12/2011 | Takaoka | |
| 2012/0042452 A1 | 2/2012 | Takaoka | |
| 2012/0104646 A1 | 5/2012 | Takaoka | |
| 2012/0112515 A1 | 5/2012 | Labish | |
| 2012/0174352 A1 | 7/2012 | Tsunoda | |
| 2012/0180939 A1 | 7/2012 | Takaoka | |
| 2012/0181841 A1 | 7/2012 | Petzel et al. | |
| 2012/0235461 A1 | 9/2012 | Rosenbrock et al. | |
| 2012/0301701 A1 | 11/2012 | Takaoka | |
| 2012/0319323 A1 | 12/2012 | Takaoka | |
| 2012/0328722 A1 | 12/2012 | Takaoka | |
| 2013/0000043 A1 | 1/2013 | Bullard et al. | |
| 2013/0020016 A1 | 1/2013 | Takaoka | |
| 2013/0137330 A1 | 5/2013 | Grimm | |
| 2013/0161858 A1 | 6/2013 | Sasaki | |
| 2013/0164123 A1 | 6/2013 | Helmenstein | |
| 2013/0189472 A1 | 7/2013 | Takaoka | |
| 2013/0200661 A1 | 8/2013 | Klusmeier et al. | |
| 2013/0247338 A1* | 9/2013 | Santin | F16B 2/22 |
| | | | 242/590 |
| 2014/0029900 A1 | 1/2014 | Logan, Jr. et al. | |
| 2014/0035191 A1 | 2/2014 | Takaoka | |
| 2014/0037907 A1 | 2/2014 | Takaoka | |
| 2014/0037908 A1 | 2/2014 | Takaoka | |
| 2014/0042792 A1 | 2/2014 | Kajiwara | |
| 2014/0062161 A1 | 3/2014 | Elenbaas et al. | |
| 2014/0138016 A1 | 5/2014 | Takaoka | |
| 2014/0167328 A1 | 6/2014 | Petzel | |
| 2014/0354029 A1 | 12/2014 | Takaoka | |
| 2014/0370769 A1 | 12/2014 | Osaki | |
| 2014/0378015 A1 | 12/2014 | Osaki | |
| 2015/0072107 A1 | 3/2015 | Fujita et al. | |
| 2015/0091209 A1 | 4/2015 | Mueller et al. | |
| 2015/0158213 A1 | 6/2015 | Mogi et al. | |
| 2015/0183349 A1 | 7/2015 | Oberle et al. | |
| 2015/0197056 A1 | 7/2015 | Takaoka | |
| 2015/0210192 A1 | 7/2015 | Benson et al. | |
| 2015/0219136 A1 | 8/2015 | Koelling | |
| 2015/0266263 A1 | 9/2015 | Ichikawa | |
| 2015/0272332 A1 | 10/2015 | Noguchi et al. | |
| 2015/0274048 A1 | 10/2015 | Mogi et al. | |
| 2015/0284894 A1 | 10/2015 | Takaoka | |
| 2015/0367583 A1 | 12/2015 | Blot et al. | |
| 2016/0009209 A1 | 1/2016 | Cao et al. | |
| 2016/0010250 A1 | 1/2016 | Taninaka et al. | |
| 2016/0023387 A1 | 1/2016 | Takaoka | |
| 2016/0032506 A1 | 2/2016 | Takaoka | |
| 2016/0051009 A1 | 2/2016 | Kormann et al. | |
| 2016/0052066 A1 | 2/2016 | Chou et al. | |
| 2016/0052433 A1 | 2/2016 | Ono et al. | |
| 2016/0052435 A1 | 2/2016 | Nakada | |
| 2016/0096462 A1 | 4/2016 | Kromm et al. | |
| 2016/0122925 A1 | 5/2016 | Shah et al. | |
| 2016/0144756 A1 | 5/2016 | Ito et al. | |
| 2016/0157628 A1 | 6/2016 | Khambete et al. | |
| 2016/0174725 A1 | 6/2016 | Takaoka | |
| 2016/0193755 A1 | 7/2016 | Humfeld | |
| 2016/0263802 A1 | 9/2016 | Takaoka | |
| 2016/0280106 A1 | 9/2016 | Sato et al. | |
| 2016/0318428 A1 | 11/2016 | Hugues | |
| 2016/0374428 A1 | 12/2016 | Kormann et al. | |
| 2017/0043695 A1 | 2/2017 | Kitamoto et al. | |
| 2017/0174346 A1 | 6/2017 | Wilson et al. | |

(56) References Cited

U.S. PATENT DOCUMENTS

| | | |
|---|---|---|
| 2017/0181505 A1 | 6/2017 | Burke et al. |
| 2017/0184108 A1 | 6/2017 | Scancarello et al. |
| 2017/0332733 A1 | 11/2017 | Cluckers et al. |
| 2018/0054858 A1 | 2/2018 | Dry |
| 2018/0070736 A1 | 3/2018 | Achten et al. |
| 2018/0086623 A1 | 3/2018 | Takaoka |
| 2018/0147792 A1 | 5/2018 | Kojima et al. |
| 2018/0148312 A1 | 5/2018 | Kojima et al. |
| 2018/0229634 A1 | 8/2018 | Baisch et al. |
| 2018/0332663 A1 | 11/2018 | Lisseman et al. |
| 2019/0002272 A1 | 1/2019 | Kristo et al. |
| 2019/0053634 A1 | 2/2019 | Chirackal et al. |
| 2019/0090656 A1 | 3/2019 | Duncan et al. |
| 2019/0125092 A1 | 5/2019 | Ando et al. |
| 2019/0135199 A1 | 5/2019 | Galan Garcia et al. |
| 2019/0161593 A1 | 5/2019 | Hattori |
| 2019/0232835 A1 | 8/2019 | Murakami |
| 2019/0241104 A1 | 8/2019 | Kondrad et al. |
| 2019/0298072 A1 | 10/2019 | Bhatia et al. |
| 2019/0344691 A1 | 11/2019 | Liau et al. |
| 2019/0351787 A1 | 11/2019 | Lodhia et al. |
| 2019/0357695 A1 | 11/2019 | Achten et al. |
| 2019/0381955 A1 | 12/2019 | Mueller et al. |
| 2019/0390382 A1 | 12/2019 | Rong et al. |
| 2020/0017006 A1 | 1/2020 | Booth et al. |
| 2020/0039399 A1 | 2/2020 | Oomen et al. |
| 2020/0165122 A1 | 5/2020 | Salzmann |
| 2020/0180479 A1 | 6/2020 | Russman et al. |
| 2020/0231428 A1 | 7/2020 | Migneco et al. |
| 2020/0262323 A1 | 8/2020 | Robinson et al. |
| 2020/0315365 A1 | 10/2020 | Kondo et al. |
| 2020/0332445 A1 | 10/2020 | Taninaka et al. |
| 2020/0360210 A1 | 11/2020 | Zoni et al. |
| 2021/0024155 A1 | 1/2021 | Primeaux et al. |
| 2021/0046731 A1 | 2/2021 | Nishikawa et al. |
| 2021/0054549 A1 | 2/2021 | Takaoka |
| 2021/0074258 A1 | 3/2021 | Konno et al. |
| 2021/0086670 A1 | 3/2021 | Kozlowski et al. |
| 2021/0115607 A1 | 4/2021 | Inoue et al. |
| 2021/0188138 A1 | 6/2021 | Powell et al. |
| 2021/0221266 A1 | 7/2021 | Kozlowski et al. |
| 2021/0237632 A1 | 8/2021 | Upendram et al. |
| 2021/0291421 A1 | 9/2021 | Nattrass et al. |
| 2021/0299995 A1 | 9/2021 | Sieradzki et al. |
| 2022/0017003 A1 | 1/2022 | Carraro et al. |
| 2022/0017718 A1 | 1/2022 | Martin et al. |
| 2022/0025561 A1 | 1/2022 | Yasui et al. |
| 2022/0169554 A1 | 6/2022 | Du Moulinet D'Hardemare et al. |
| 2022/0178057 A1 | 6/2022 | Maschino et al. |
| 2022/0314851 A1 | 10/2022 | Pereny et al. |
| 2022/0314854 A1 | 10/2022 | Pereny et al. |
| 2022/0370749 A1 | 11/2022 | Dunn et al. |
| 2022/0402416 A1 | 12/2022 | Yang et al. |
| 2022/0410775 A1 | 12/2022 | Aoki et al. |
| 2023/0028451 A1 | 1/2023 | Gastaldi |
| 2023/0173964 A1 | 6/2023 | Webster et al. |
| 2023/0191678 A1 | 6/2023 | Blair et al. |
| 2023/0191680 A1 | 6/2023 | Blair et al. |
| 2023/0322135 A1 | 10/2023 | Hallock et al. |
| 2023/0322136 A1 | 10/2023 | Wang et al. |
| 2023/0339374 A1 | 10/2023 | Abdella et al. |
| 2024/0010108 A1 | 1/2024 | Hallock et al. |
| 2024/0066824 A1 | 2/2024 | Cluet et al. |
| 2024/0133078 A1 | 4/2024 | Hirano et al. |
| 2025/0206210 A1* | 6/2025 | Brudzynsky ......... B60N 2/5825 |
| 2025/0222843 A1* | 7/2025 | Hale ................... B60N 2/7017 |

FOREIGN PATENT DOCUMENTS

| | | |
|---|---|---|
| BR | 112014004632 B1 | 4/2021 |
| BR | 112014001603 A2 | 8/2021 |
| BR | 112013020474 B1 | 9/2021 |
| BR | 112017016357 B1 | 3/2022 |
| CA | 3102262 A1 | 12/2019 |
| CN | 100467696 C | 3/2009 |
| CN | 1859862 B | 4/2010 |
| CN | 102011686 A | 4/2011 |
| CN | 202509164 U | 10/2012 |
| CN | 104582538 A | 4/2015 |
| CN | 105026632 A | 11/2015 |
| CN | 102959151 B | 4/2016 |
| CN | 105612279 A | 5/2016 |
| CN | 103328711 B | 6/2016 |
| CN | 104024511 B | 8/2016 |
| CN | 106231959 A | 12/2016 |
| CN | 104080959 B | 2/2017 |
| CN | 106387295 A | 2/2017 |
| CN | 106458070 A | 2/2017 |
| CN | 103998668 B | 3/2017 |
| CN | 103827376 B | 6/2017 |
| CN | 105683434 B | 7/2017 |
| CN | 104285003 B | 9/2017 |
| CN | 105705695 B | 1/2018 |
| CN | 207140883 U | 3/2018 |
| CN | 208484779 U | 2/2019 |
| CN | 109552123 A | 4/2019 |
| CN | 109680413 A | 4/2019 |
| CN | 110316033 A | 10/2019 |
| CN | 107614238 B | 2/2020 |
| CN | 111038431 A | 4/2020 |
| CN | 107208339 B | 6/2020 |
| CN | 107532357 B | 8/2020 |
| CN | 111989430 A | 11/2020 |
| CN | 112020578 A | 12/2020 |
| CN | 107708493 B | 1/2021 |
| CN | 112192846 A | 1/2021 |
| CN | 107208340 B | 2/2021 |
| CN | 109552123 B | 7/2021 |
| CN | 113166995 A | 7/2021 |
| CN | 213618701 U | 7/2021 |
| CN | 215203369 U | 12/2021 |
| CN | 113930900 A | 1/2022 |
| CN | 109680412 B | 2/2022 |
| CN | 115139881 A | 10/2022 |
| CN | 208484779 A | 10/2022 |
| CN | 117043246 A | 11/2023 |
| CN | 118748961 A | 10/2024 |
| DE | 2240769 A1 | 3/1973 |
| DE | 2534054 A1 | 2/1976 |
| DE | 2626748 A1 | 12/1977 |
| DE | 2626748 C3 | 10/1979 |
| DE | 3037834 A1 | 4/1982 |
| DE | 3127303 A1 | 1/1983 |
| DE | 3037834 C2 | 5/1987 |
| DE | 3690196 C1 | 10/1989 |
| DE | 3920529 C1 | 8/1990 |
| DE | 4214389 A1 | 11/1993 |
| DE | 29822649 U1 | 4/1999 |
| DE | 20100848 U1 | 3/2001 |
| DE | 102004053133 A1 | 5/2006 |
| DE | 202006017670 U1 | 7/2007 |
| DE | 102006020306 A1 | 11/2007 |
| DE | 102008033468 A1 | 2/2009 |
| DE | 112013005643 T5 | 8/2015 |
| DE | 202018104691 U1 | 11/2019 |
| DE | 112019002208 T5 | 1/2021 |
| DE | 102020210092 A1 | 3/2021 |
| DE | 102020127913 A | 6/2021 |
| DE | 102021129112 A1 | 10/2022 |
| DE | 102022107559 A1 | 10/2022 |
| DE | 112022005732 T5 | 10/2024 |
| DK | 1832675 T3 | 6/2013 |
| DK | 2772576 T3 | 5/2015 |
| DK | 3255192 T3 | 3/2020 |
| DK | 202370024 A1 | 2/2024 |
| DK | 202370025 A1 | 2/2024 |
| DK | 202370027 A1 | 2/2024 |
| DK | 202370028 A1 | 2/2024 |
| DK | 202370029 A1 | 2/2024 |
| DK | 202370197 A1 | 2/2024 |
| DK | 202370420 A1 | 8/2024 |
| DK | 202370426 A1 | 8/2024 |
| EP | 0145603 A2 | 6/1985 |
| EP | 0240388 A2 | 10/1987 |

(56) References Cited

FOREIGN PATENT DOCUMENTS

| | | | |
|---|---|---|---|
| EP | 0370991 | A2 | 5/1990 |
| EP | 0459365 | A1 | 12/1991 |
| EP | 0805064 | A2 | 11/1997 |
| EP | 0890430 | A2 | 1/1999 |
| EP | 0894885 | A2 | 2/1999 |
| EP | 0926302 | A2 | 6/1999 |
| EP | 1082480 | A1 | 3/2001 |
| EP | 0894885 | B1 | 11/2002 |
| EP | 1586687 | A1 | 10/2005 |
| EP | 1270787 | B1 | 6/2010 |
| EP | 2230132 | A1 | 9/2010 |
| EP | 1858944 | B1 | 7/2011 |
| EP | 2417876 | A1 | 2/2012 |
| EP | 2532502 | A1 | 12/2012 |
| EP | 2565304 | A1 | 3/2013 |
| EP | 1832675 | B1 | 4/2013 |
| EP | 1683446 | B1 | 7/2013 |
| EP | 2774807 | A2 | 9/2014 |
| EP | 2489770 | B1 | 1/2015 |
| EP | 2772576 | B1 | 4/2015 |
| EP | 2653598 | B1 | 7/2016 |
| EP | 3210487 | A1 | 8/2017 |
| EP | 2792776 | B1 | 10/2017 |
| EP | 2792775 | B1 | 11/2017 |
| EP | 2848721 | B1 | 1/2018 |
| EP | 3305500 | A1 | 4/2018 |
| EP | 2751312 | B1 | 7/2018 |
| EP | 3064627 | B1 | 8/2018 |
| EP | 3064628 | B1 | 8/2018 |
| EP | 2894246 | B1 | 10/2018 |
| EP | 2966206 | B1 | 11/2018 |
| EP | 3441258 | A1 | 2/2019 |
| EP | 3256632 | B1 | 3/2019 |
| EP | 3255192 | B1 | 1/2020 |
| EP | 3779017 | A1 | 2/2021 |
| EP | 3826820 | A1 | 6/2021 |
| EP | 3889332 | A1 | 10/2021 |
| EP | 3610760 | B1 | 11/2021 |
| EP | 3974572 | A1 | 3/2022 |
| EP | 4461166 | A1 | 11/2024 |
| ES | 2335962 | A1 | 4/2010 |
| ES | 2335962 | B1 | 4/2010 |
| ES | 2346180 | T3 | 10/2010 |
| ES | 2715028 | T3 | 5/2019 |
| FR | 2432108 | A1 | 2/1980 |
| FR | 2486922 | A3 | 1/1982 |
| FR | 2596626 | A1 | 10/1987 |
| FR | 2675440 | B1 | 12/1993 |
| FR | 2850260 | A1 | 7/2004 |
| FR | 3050409 | B1 | 10/2017 |
| FR | 3063461 | B1 | 3/2019 |
| FR | 3109753 | B1 | 11/2021 |
| GB | 721866 | A | 1/1955 |
| GB | 1009799 | A | 11/1965 |
| GB | 2275695 | A | 9/1994 |
| GB | 2576141 | A | 2/2020 |
| GB | 2577591 | B | 4/2021 |
| GB | 2589497 | B | 11/2021 |
| GB | 2607058 | A | 11/2022 |
| GB | 2628886 | A | 10/2024 |
| IN | 201717042989 | A | 3/2018 |
| IN | 336480 | B | 5/2020 |
| IN | 202047045846 | A | 10/2020 |
| IN | 351780 | B | 11/2020 |
| IN | 382056 | B | 11/2021 |
| IN | 202117027707 | A | 11/2021 |
| JP | S52105392 | A | 9/1977 |
| JP | S556515 | A | 1/1980 |
| JP | S5517527 | A | 2/1980 |
| JP | S62128739 | A | 6/1987 |
| JP | H04286627 | A | 10/1992 |
| JP | H05211909 | A | 8/1993 |
| JP | H05220764 | A | 8/1993 |
| JP | H07300760 | A | 11/1995 |
| JP | H0856712 | A | 3/1996 |
| JP | H0861413 | A | 3/1996 |
| JP | H0861414 | A | 3/1996 |
| JP | H0874161 | A | 3/1996 |
| JP | H1046185 | A | 2/1998 |
| JP | H10128890 | A | 5/1998 |
| JP | H10248685 | A | 9/1998 |
| JP | H115282 | A | 1/1999 |
| JP | H1148275 | A | 2/1999 |
| JP | H11350326 | A | 12/1999 |
| JP | 2000004993 | A | 1/2000 |
| JP | 2000509335 | A | 7/2000 |
| JP | 2000248455 | A | 9/2000 |
| JP | 2001046185 | A | 2/2001 |
| JP | 2001055719 | A | 2/2001 |
| JP | 2001061607 | A | 3/2001 |
| JP | 2001061612 | A | 3/2001 |
| JP | 2001070106 | A | 3/2001 |
| JP | 2001310378 | A | 11/2001 |
| JP | 2001329631 | A | 11/2001 |
| JP | 2002084894 | A | 3/2002 |
| JP | 2002087879 | A | 3/2002 |
| JP | 2002088636 | A | 3/2002 |
| JP | 2003012905 | A | 1/2003 |
| JP | 2003250667 | A | 9/2003 |
| JP | 2003251089 | A | 9/2003 |
| JP | 2003268668 | A | 9/2003 |
| JP | 2004202858 | A | 7/2004 |
| JP | 3589307 | B2 | 11/2004 |
| JP | 3686690 | B2 | 8/2005 |
| JP | 3686692 | B2 | 8/2005 |
| JP | 2006006924 | A | 1/2006 |
| JP | 2006200117 | A | 8/2006 |
| JP | 2006200119 | A | 8/2006 |
| JP | 2006200120 | A | 8/2006 |
| JP | 2007098013 | A | 4/2007 |
| JP | 4181878 | B2 | 11/2008 |
| JP | 2009090089 | A | 4/2009 |
| JP | 4347647 | B2 | 10/2009 |
| JP | 4350285 | B2 | 10/2009 |
| JP | 4350286 | B2 | 10/2009 |
| JP | 4350287 | B2 | 10/2009 |
| JP | 2010524569 | A | 7/2010 |
| JP | 2011045424 | A | 3/2011 |
| JP | 2011152779 | A | 8/2011 |
| JP | 2011177413 | A | 9/2011 |
| JP | 4835150 | B2 | 12/2011 |
| JP | 4907991 | B2 | 4/2012 |
| JP | 2012115515 | A | 6/2012 |
| JP | 2012171360 | A | 9/2012 |
| JP | 5165809 | B1 | 3/2013 |
| JP | 2013091862 | A | 5/2013 |
| JP | 5339107 | B1 | 11/2013 |
| JP | 5418741 | B1 | 2/2014 |
| JP | 2014038151 | A | 2/2014 |
| JP | 5454733 | B1 | 3/2014 |
| JP | 5454734 | B1 | 3/2014 |
| JP | 2014064767 | A | 4/2014 |
| JP | 5532178 | B1 | 6/2014 |
| JP | 5532179 | B1 | 6/2014 |
| JP | 2014104050 | A | 6/2014 |
| JP | 5569641 | B1 | 8/2014 |
| JP | 2015119825 | A | 7/2015 |
| JP | 2015205611 | A | 11/2015 |
| JP | 5868964 | B2 | 2/2016 |
| JP | 2016028900 | A | 3/2016 |
| JP | 2016036972 | A | 3/2016 |
| JP | 5909581 | B1 | 4/2016 |
| JP | 5976511 | B2 | 8/2016 |
| JP | 5986584 | B2 | 9/2016 |
| JP | 5990194 | B2 | 9/2016 |
| JP | 2016189879 | A | 11/2016 |
| JP | 6182249 | B2 | 8/2017 |
| JP | 2017150100 | A | 8/2017 |
| JP | 6228278 | B2 | 11/2017 |
| JP | 2017196142 | A | 11/2017 |
| JP | 2017226230 | A | 12/2017 |
| JP | 2018500990 | A | 1/2018 |
| JP | 2018027163 | A | 2/2018 |
| JP | 6294140 | B2 | 3/2018 |

(56) References Cited

FOREIGN PATENT DOCUMENTS

| | | | |
|---|---|---|---|
| JP | WO2016189879 | A1 | 3/2018 |
| JP | 6311918 | B2 | 4/2018 |
| JP | 6311919 | B2 | 4/2018 |
| JP | 6318643 | B2 | 5/2018 |
| JP | 6347492 | B2 | 6/2018 |
| JP | 6527602 | B2 | 6/2019 |
| JP | 6566900 | B2 | 8/2019 |
| JP | 2019173217 | A | 10/2019 |
| JP | 2019173218 | A | 10/2019 |
| JP | 2019189972 | A | 10/2019 |
| JP | 2019210565 | A | 12/2019 |
| JP | 6661666 | B2 | 3/2020 |
| JP | 2020045589 | A | 3/2020 |
| JP | 2020090648 | A | 6/2020 |
| JP | 6725823 | B2 | 7/2020 |
| JP | 2020127523 | A | 8/2020 |
| JP | 2020156629 | A | 10/2020 |
| JP | 6786500 | B2 | 11/2020 |
| JP | 2020192164 | A | 12/2020 |
| JP | 6819297 | B2 | 1/2021 |
| JP | 2021045365 | A | 3/2021 |
| JP | 6863537 | B2 | 4/2021 |
| JP | 6909823 | B2 | 7/2021 |
| JP | WO2020090648 | A1 | 10/2021 |
| JP | 7002010 | B2 | 2/2022 |
| JP | 7158968 | B2 | 10/2022 |
| KR | 200207612 | Y1 | 1/2001 |
| KR | 20090035561 | A | 4/2009 |
| KR | 101141773 | B1 | 5/2012 |
| KR | 101250622 | B1 | 4/2013 |
| KR | 20130067823 | A | 6/2013 |
| KR | 20170017488 | A | 2/2017 |
| KR | 101717488 | B1 | 3/2017 |
| KR | 101722929 | B1 | 4/2017 |
| KR | 101722932 | B1 | 4/2017 |
| KR | 101756629 | B1 | 7/2017 |
| KR | 20170107554 | A | 9/2017 |
| KR | 20170117085 | A | 10/2017 |
| KR | 101829235 | B1 | 2/2018 |
| KR | 101928730 | B1 | 3/2019 |
| KR | 101961514 | B1 | 3/2019 |
| KR | 101983204 | B1 | 5/2019 |
| KR | 102002393 | B1 | 7/2019 |
| KR | 102083055 | B1 | 2/2020 |
| KR | 102137446 | B1 | 7/2020 |
| KR | 102148214 | B1 | 8/2020 |
| KR | 102227060 | B1 | 3/2021 |
| KR | 20210076130 | A | 6/2021 |
| KR | 20220034241 | A | 3/2022 |
| NL | 1032699 | C2 | 4/2008 |
| SE | 524231 | C2 | 7/2004 |
| WO | 1992018224 | A | 10/1992 |
| WO | 1992018224 | A1 | 10/1992 |
| WO | 1995015768 | A | 6/1995 |
| WO | 1995015768 | A1 | 6/1995 |
| WO | 1997002377 | A1 | 1/1997 |
| WO | 2000047801 | A1 | 8/2000 |
| WO | 2000071382 | A1 | 11/2000 |
| WO | 01068967 | A1 | 9/2001 |
| WO | 2002061217 | A1 | 8/2002 |
| WO | 2004014690 | A1 | 2/2004 |
| WO | 2004063450 | A1 | 7/2004 |
| WO | 2005030011 | A1 | 4/2005 |
| WO | 2006068120 | A1 | 6/2006 |
| WO | 2008016770 | A1 | 2/2008 |
| WO | 2009092153 | A1 | 7/2009 |
| WO | 2010048515 | A1 | 4/2010 |
| WO | 2010068854 | A1 | 6/2010 |
| WO | 2010090093 | A1 | 8/2010 |
| WO | 2011102951 | A1 | 8/2011 |
| WO | 2012035736 | A1 | 3/2012 |
| WO | 2012157289 | A1 | 11/2012 |
| WO | 2012167950 | A1 | 12/2012 |
| WO | 2013030400 | A1 | 3/2013 |
| WO | 2013088736 | A1 | 6/2013 |
| WO | 2013088737 | A1 | 6/2013 |
| WO | 2013168699 | A1 | 11/2013 |
| WO | 2014038151 | A1 | 3/2014 |
| WO | 2014075198 | A1 | 5/2014 |
| WO | 2014080614 | A1 | 5/2014 |
| WO | 2014132484 | A1 | 9/2014 |
| WO | 2015050134 | A1 | 4/2015 |
| WO | 2015064523 | A1 | 5/2015 |
| WO | 2015064557 | A1 | 5/2015 |
| WO | 2015125497 | A1 | 8/2015 |
| WO | 2015163188 | A1 | 10/2015 |
| WO | 2016125766 | A1 | 8/2016 |
| WO | 2016130602 | A1 | 8/2016 |
| WO | 2016177425 | A1 | 11/2016 |
| WO | 2016189879 | A1 | 12/2016 |
| WO | 2017119157 | A1 | 7/2017 |
| WO | 2017122370 | A1 | 7/2017 |
| WO | 2017199474 | A1 | 11/2017 |
| WO | 2018068451 | A1 | 4/2018 |
| WO | 2018172385 | A1 | 9/2018 |
| WO | 2019036559 | A1 | 2/2019 |
| WO | 2019166691 | A1 | 9/2019 |
| WO | 2019188090 | A1 | 10/2019 |
| WO | 2019230304 | A1 | 12/2019 |
| WO | 2020021263 | A1 | 1/2020 |
| WO | 2020045589 | A1 | 3/2020 |
| WO | 2020090648 | A1 | 5/2020 |
| WO | 2020111110 | A1 | 6/2020 |
| WO | 2020116327 | A1 | 6/2020 |
| WO | 2020245670 | A1 | 12/2020 |
| WO | 2021074601 | A1 | 4/2021 |
| WO | 2021122937 | A1 | 6/2021 |
| WO | 2021141601 | A1 | 7/2021 |
| WO | 2022097435 | A1 | 5/2022 |
| WO | 2023071240 | A1 | 5/2023 |
| WO | 2023101995 | A2 | 6/2023 |
| WO | 2023122018 | A2 | 6/2023 |
| WO | 2023132308 | A1 | 7/2023 |
| WO | 2023172483 | A1 | 9/2023 |
| WO | 2023204905 | A1 | 10/2023 |
| WO | 2023218805 | A1 | 11/2023 |
| WO | 2023220261 | A1 | 11/2023 |
| WO | 2023244721 | A1 | 12/2023 |
| WO | 2023244727 | A1 | 12/2023 |
| WO | 2023244758 | A1 | 12/2023 |
| WO | 2023249895 | A1 | 12/2023 |
| WO | 2023250026 | A1 | 12/2023 |
| WO | 2024006134 | A1 | 1/2024 |
| WO | 2024006143 | A1 | 1/2024 |
| WO | 2024097012 | A1 | 5/2024 |
| WO | 2024136943 | A1 | 6/2024 |

OTHER PUBLICATIONS

Examination Report dated Oct. 7, 2024 for related Appln. No. GB2405709.3; 2 Pages.

https://www.toyobo-global.com/seihin/breathair_youto_htm, Toyobo Breathair, Cushion Materials, 1996-2013, 3 pages.

https://www.youtube.com/watch2v=eFiPBu fBe4, The Making of a Newton Wovenaire Crib Mattress, Apr. 21, 2016, 3 pages.

http://airstring.com, Introducing Airstring The Future of Cushioning, 2016, 3 pages.

Airstring.com, About Airstring, Jan. 18, 2021, 13 pages.

www.newtonbaby.com/pages/design, Born in water, designed to breathe, Jan. 28, 2021, 1 pages.

https://www.toyobo-global.com/seihin/breathair/breathair_youto.htm, Applications, Sep. 10, 2019, 5 pages.

https://www.youtube.com/watch?v=eFiPBu_fBe4, The Making of a Newton Wovenaire Crib Mattress—YouTube, 3 pages, Apr. 21, 2016.

* cited by examiner

SEAT ASSEMBLY, CLIP, AND METHOD OF MANUFACTURE

CROSS-REFERENCE TO RELATED APPLICATIONS

This application claims the benefit of U.S. provisional application Ser. No. 63/508,301, filed Jun. 15, 2023, and Denmark patent application no. PA202370583, filed Nov. 21, 2023, the disclosures of which are hereby incorporated in their entirety by reference herein.

TECHNICAL FIELD

Various embodiments relate to seat assembly, a clip that secures a trim cover to a seat assembly, and a method of manufacture.

DETAILED DESCRIPTION

Figures 1, 2:
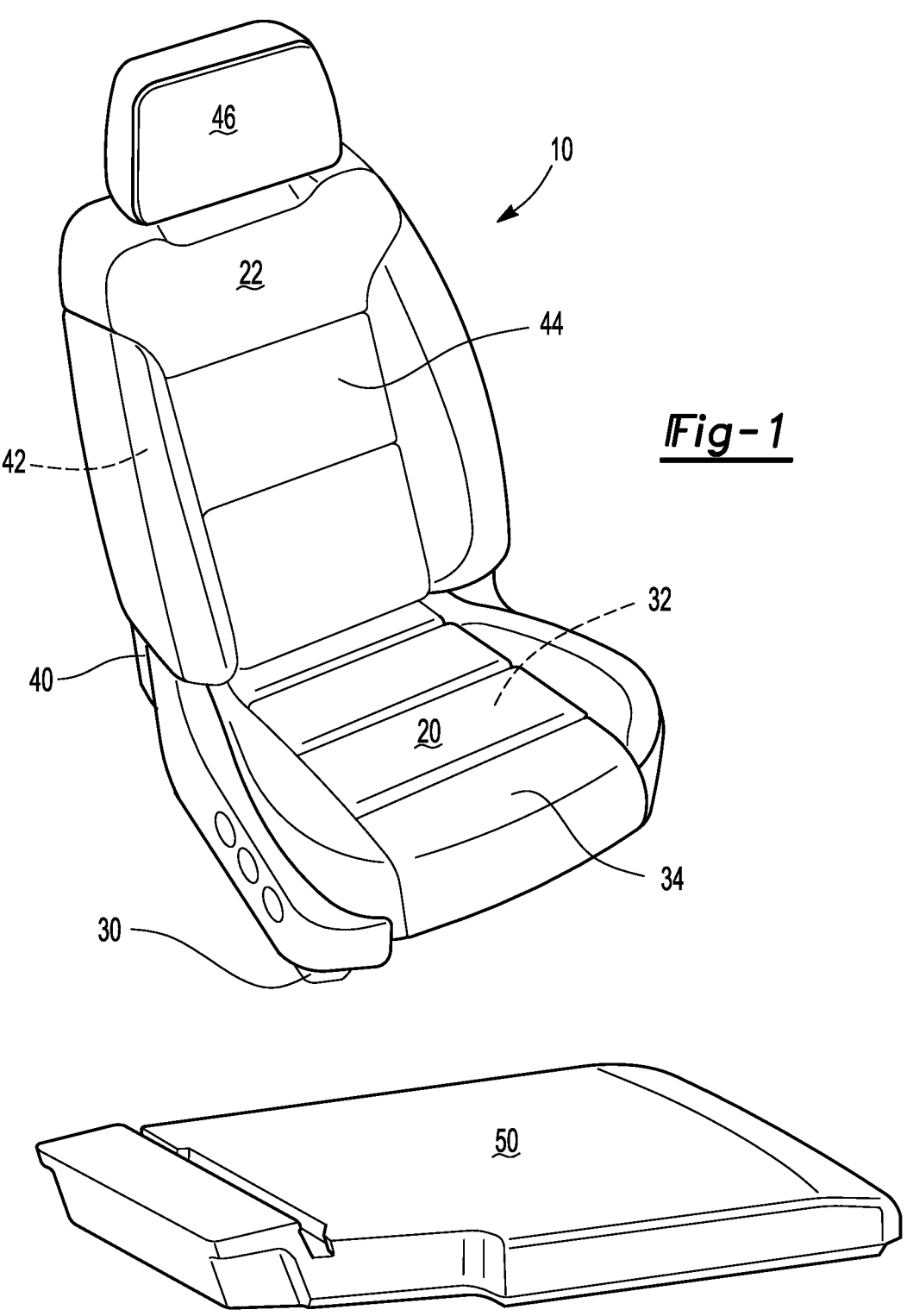
FIG. 1 is a perspective view of an example of a seat assembly.
FIG. 2 is a perspective view of an example of a cushion of the seat assembly.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Referring to FIG. 1, an example of a seat assembly 10 is shown. In some embodiments, the seat assembly 10 is a vehicle seat assembly, such as for a land vehicle like a car, truck, bus, or the like, or for a non-land vehicle like aircraft or watercraft. For example, a seat assembly 10 for a land vehicle may be shaped and sized as a front row driver or passenger seat, a second, third, or other rear row seat, and may include bench-style seats, bucket seats, or other seat styles. Furthermore, the seat assembly 10 may be a non-stowable seat or a stowable seat that may be foldable or foldable and stowable in a cavity in the vehicle floor. Additionally, the seat assembly 10 may be configured for non-vehicle applications such as furniture.

In the configuration shown in FIG. 1, the seat assembly 10 includes a seat bottom 20 and a seat back 22. It is contemplated that the seat back 22 may be omitted in some configurations, such as when the seat assembly 10 is configured as a motorcycle seat or stool.

The seat bottom 20 is configured to receive a seated occupant and support the pelvis and thighs of the seat occupant. The seat bottom 20 includes a seat bottom frame 30, a cushion 32, and a trim cover 34.

The seat bottom frame 30 is a structure that supports the cushion 32. The seat bottom frame 30 includes one or more structural members and may be made of any suitable material, such as a metal alloy, polymeric material, fiber reinforced polymeric material, or combinations thereof. In one or more configurations, the seat bottom frame 30 includes a panel, seat pan, suspension mat, or suspension wires upon which the cushion 32 is disposed.

The cushion 32 is disposed on the seat bottom frame 30. The cushion 32 is made of a compliant material that supports the seat occupant and distributes load forces from the seat occupant to the seat bottom frame 30. The cushion 32 and associated methods of manufacture will be discussed in more detail below.

The trim cover 34 covers at least a portion of the cushion 32. In addition, the trim cover 34 provides one or more visible exterior surfaces of the seat back 22. The seat occupant may be disposed on the trim cover 34 when seated upon the seat assembly 10. The trim cover 34 is made of any suitable material or materials, such as fabric, leather, leatherette, vinyl, or combinations thereof. The trim cover 34 may include a plurality of trim panels that are assembled in any suitable manner, such as by fusing or stitching. The trim cover 34 is attached to the seat bottom frame 30, the cushion 32, or both. For example, the trim cover 34 may include trim attachment features that are attached to the seat bottom frame 30, the cushion 32, or both, to inhibit removal of the trim cover 34 and help conform the trim cover 34 to the contour of the seat bottom frame 30, the cushion 32, or both. It is contemplated that different types of trim attachment features may be employed to attach the trim cover 34 to the seat bottom frame 30 than to the cushion 32.

The seat back 22 is configured to support the back of a seated occupant. The seat back 22 is disposed adjacent to the seat bottom 20. For example, the seat back 22 may be disposed above the seat bottom 20 and near the rear side of the seat bottom 20. The seat back 22 extends in a generally upward direction away from the seat bottom 20. In some configurations, the seat back 22 is mounted to the seat bottom 20 and may be pivotable with respect to the seat bottom 20. In other configurations, the seat back 22 is not mounted to the seat bottom 20. For instance, a vehicle seat back may be mounted to the vehicle body structure, such as in some second row seat assemblies. The seat back 22 includes a seat back frame 40, a cushion 42, a trim cover 44, and optionally a head restraint 46.

The seat back frame 40 is a structure that supports the cushion 42. The seat back frame 40 includes one or more structural members and may be made of any suitable material, such as a metal alloy, polymeric material, fiber reinforced polymeric material, or combinations thereof. In one or more configurations, the seat back frame 40 includes a panel, pan, suspension mat, or suspension wires upon which the cushion 42 is disposed. It is also contemplated that the seat back frame 40 may be integrally formed with the seat bottom frame 30.

The cushion 42 is disposed on the seat back frame 40. The cushion 42 is made of a compliant material that supports the seat occupant and distributes load forces from the seat occupant to the seat back frame 40. It is contemplated that the cushion 42 may be integrally formed with the cushion 32 of the seat bottom 20 or separate from the cushion 32 of the seat bottom 20. The cushion 42 and associated methods of manufacture will be discussed in more detail below.

The trim cover 44 covers at least a portion of the cushion 42. In addition, the trim cover 44 provides one or more visible exterior surfaces of the seat back 22. The seat occupant may be disposed on the trim cover 44 when seated upon the seat assembly 10. The trim cover 44 is made of any suitable material or materials, such as fabric, leather, leatherette, vinyl, or combinations thereof. The trim cover 44 may include a plurality of trim panels that are assembled in any suitable manner, such as by fusing or stitching. The trim cover 44 is attached to the seat back frame 40, the cushion 42, or both. For example, the trim cover 44 may include trim attachment features that are attached to the seat back frame 40, the cushion 42, or both, to inhibit removal of the trim cover 44 and help conform the trim cover 44 to the contour of the seat back frame 40, the cushion 42, or both. It is contemplated that different types of trim attachment features may be employed to attach the trim cover 44 to the seat back frame 40 than to the cushion 42.

The head restraint 46, if provided, is configured to support the head of a seat occupant. The head restraint 46 is disposed at the top of the seat back 22 or at an end of the seat back 22 that is disposed opposite the seat bottom 20. The head restraint 46 may be moveable in one or more directions with respect to the seat back 22 or may be integrally formed with the seat back 22.

Referring to FIG. 2, an example of a cushion 50 is shown. The cushion is generically designated with reference number 50 for convenience in reference. It is to be understood that the structure and description of the cushion 50 is applicable to the cushion 32 of the seat bottom 20, the cushion 42 of the seat back 22, or both.

In some embodiments, the cushion 50 is a non-foam component or includes at least one non-foam component. The non-foam component is primarily referred to as a filament mesh structure but may also be referred to as a mesh cushion, mesh structure, or stranded mesh. In FIG. 2, the cushion 50 is depicted as a non-foam component that does not include a foam component or foam material, such as urethane or polyurethane foam; however, it is contemplated that the cushion 50 may also include a foam component or foam material in addition to a non-foam component to provide additional cushioning or localized cushioning for a seat occupant. For example, foam material may be provided between the cushion 50 and a trim cover (e.g., trim cover 34, 44) that is disposed on the cushion 50, within the cushion 50, or combinations thereof. Reducing the amount of foam material that is provided with the cushion 50 or eliminating foam material from the cushion 50 reduces weight and may improve support and comfort of a seat occupant.

Figures 9, 10, 11, 12:
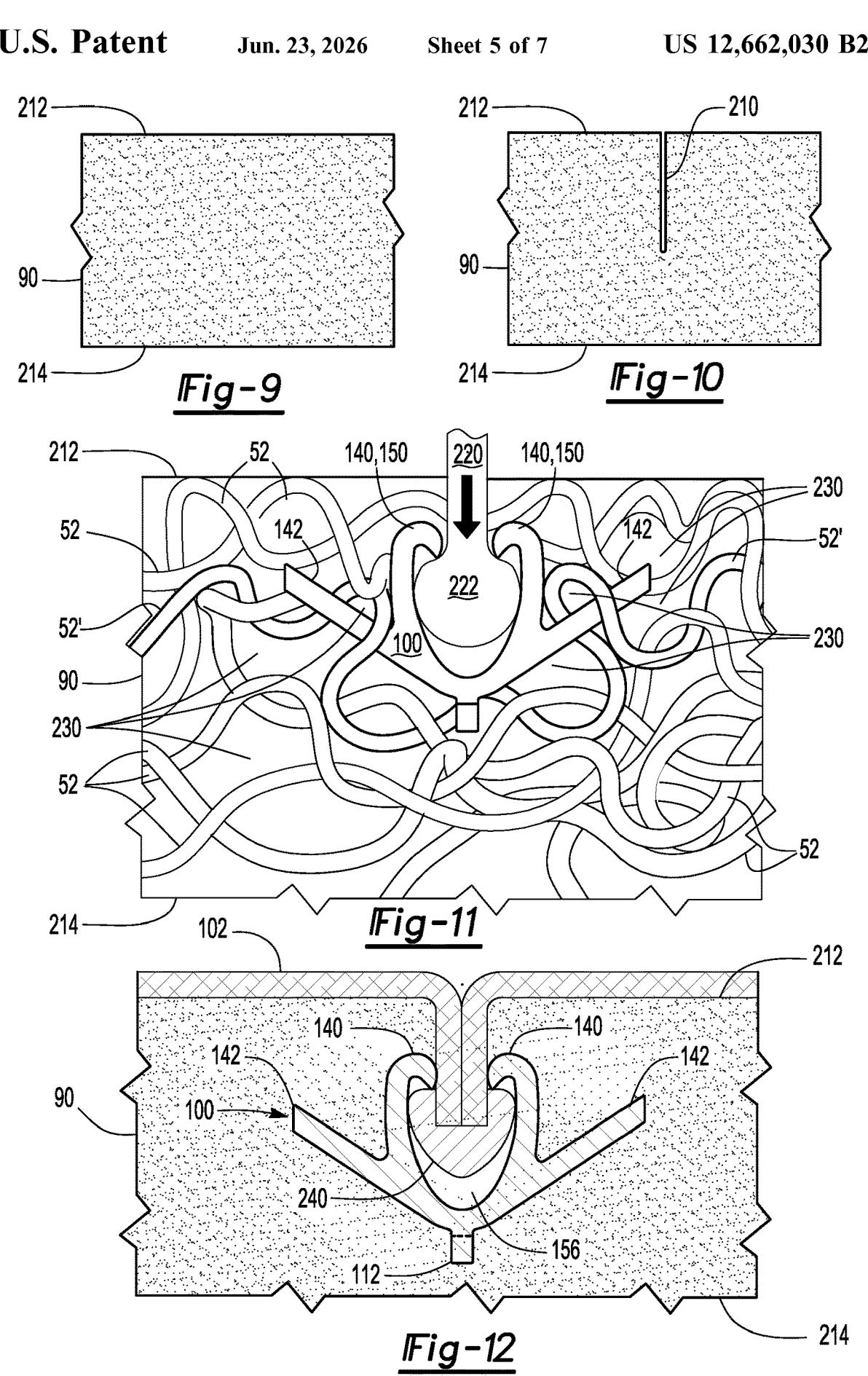
FIG. 9 is a simplified side view of the filament mesh structure.
FIG. 10 is a simplified side view of the filament mesh structure with a slit.
FIG. 11 is a side view of the filament mesh structure with the clip, the clip being shown as an end view.
FIG. 12 is a simplified side view of the filament mesh structure with a trim cover secured to the clip.
Figure 13:
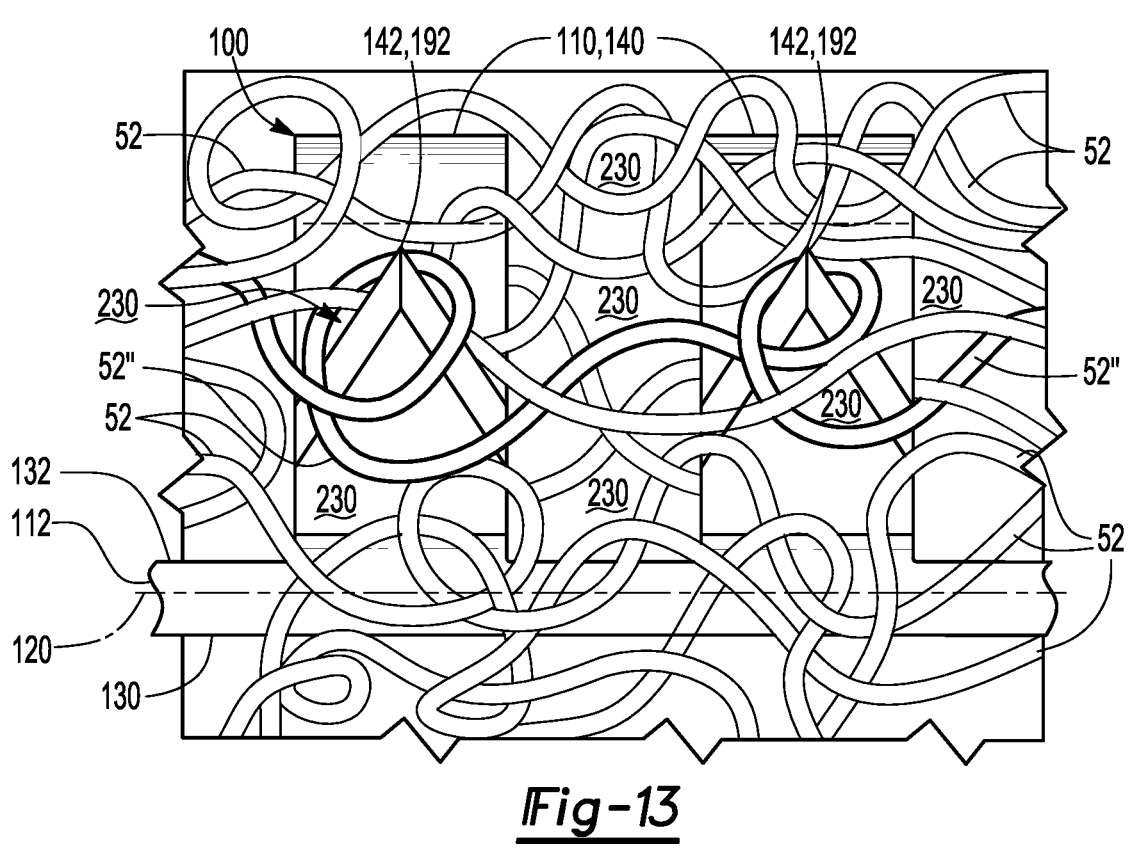
FIG. 13 is a side view of the filament mesh structure with the clip, the clip being shown as a side view.

The cushion 50 is primarily described below in the context of a cushion 50 that does not include foam material. In this context, the cushion 50 is made of filaments 52 of polymeric material that are randomly looped, bent, curled, or entangled and are bonded together as will be discussed in more detail below. A magnified view of a cushion with examples of filaments 52 is shown in FIGS. 11 and 13. A filament 52 is directly bonded to another filament 52 rather than being indirectly bonded with a resin or other intermediate material.

The filaments 52, which may also be referred to as strands or threads, are made of any suitable material or materials. In some configurations, the filaments 52 are made of a polymeric material or thermoplastic material, such as a thermoplastic resin that is polyamide-based, polyester-based, polyimide-based, polyolefin-based (e.g., polypropylene-based, polyethylene-based, etc.), polystyrene-based, or combinations thereof. As one example, a polyethylene-based filament may be made of linear low density polyethylene (LLPDE). The filament material may be recyclable unlike foam material or more easily recycled than foam material. It is also contemplated that a filament 52 may comprise reinforcement fibers and that the reinforcement fibers may not be made of a thermoplastic material.

In some configurations, a filament 52 may be a monofilament that is made of a single material. In some configurations, a filament 52 is made of multiple materials. As an example, a filament 52 made of multiple materials may include a core that is made of a first thermoplastic material and a sheath that encircles the core and is made of a second thermoplastic material that differs from the first thermoplastic material. It is contemplated that the cushion 50 may include a combination of monofilaments and filaments that are made of multiple materials and are not monofilaments.

Figure 3:
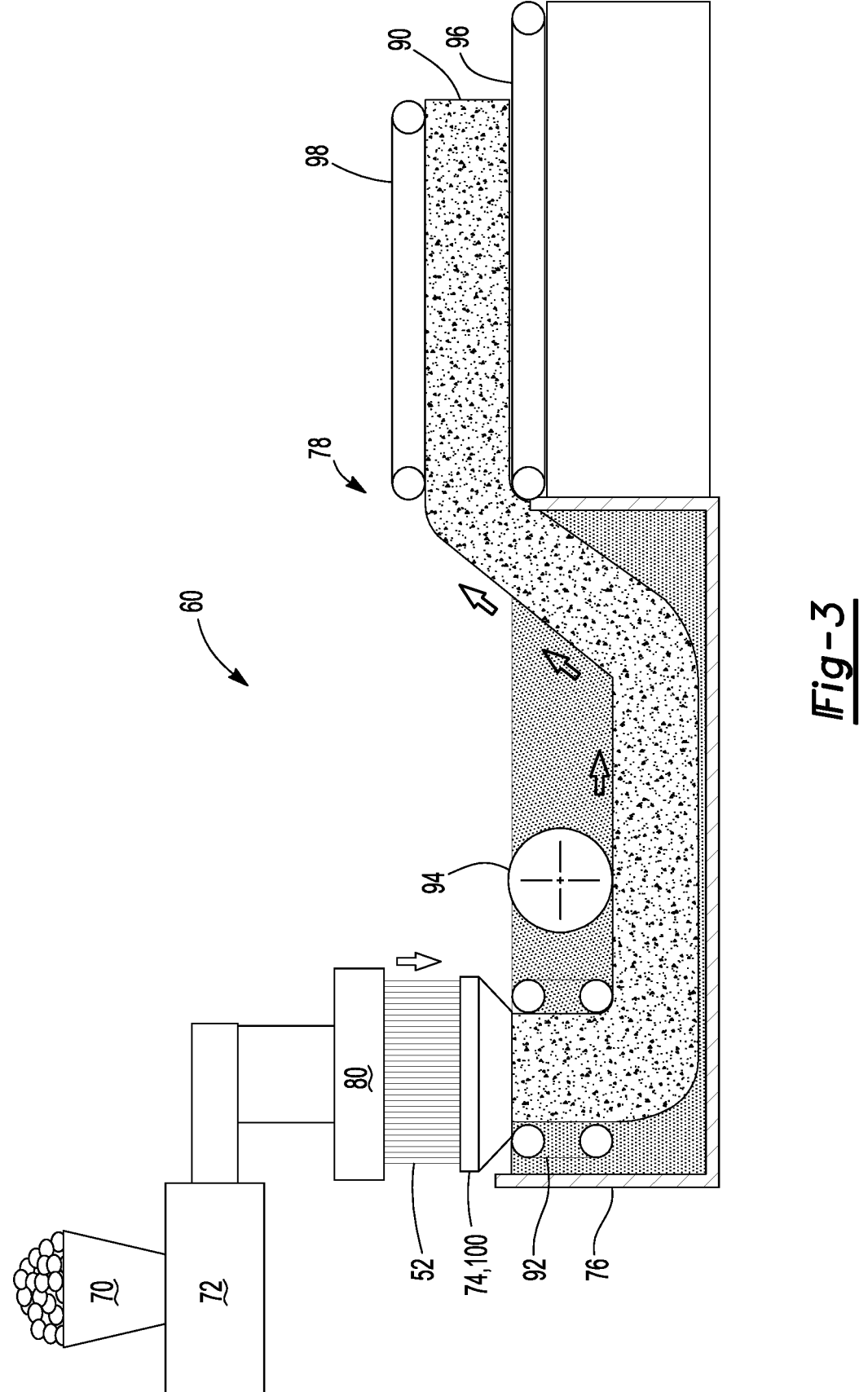
FIG. 3 is schematic view of an example of a manufacturing system for making a filament mesh structure for the cushion.

Filaments 52 that are randomly looped, bent, looped, curled, or entangled are bonded together where one filament 52 contacts another filament 52, thereby resulting in a lightweight, air permeable cushion (e.g., cushion 32 and/or 42) or mesh structure having openings or voids between the filaments 52. An example of a manufacturing system 60 of making a cushion or filament mesh structure is also shown in FIG. 3. In this example, the manufacturing system 60 includes a material supply 70, an extruder 72, and a funnel 74. The manufacturing system 60 also includes a cooling tank 76 and a material handling subsystem 78.

Referring to FIG. 3, the material supply 70 holds material stock that is to be extruded, such as solid beads, flakes, granules, pellets, or powder made of the material. In some configurations, the material supply 70 is configured as a container or hopper. The material supply 70 provides material stock to the extruder 72.

The extruder 72 melts the material stock and extrudes the material stock into a set of filaments 52. The extruder 72 may have any suitable configuration. In some configurations, the extruder 72 includes a barrel that receives a rotatable screw and heating elements. Rotation of the screw forces the material to move through the barrel and helps heat the material due to the friction generated as the screw rotates. The material exits the barrel under pressure and in a molten state and is transported to a die 80 of the extruder 72.

The die 80, which may also be referred to as a die plate or extrusion die, has multiple through holes or filament forming openings through which the molten material passes. A single filament 52 is extruded from each through hole. The filaments 52 fall downward from the die 80 under the force of gravity into the funnel 74.

The funnel 74 consolidates or groups the filaments 52 into a more compact arrangement in which the filaments bend, curl, or loop and a filament 52 contacts and bonds to at least one other filament 52. The funnel 74 has a funnel inlet and a funnel outlet that is smaller than the funnel inlet. Individual separated filaments 52 enter the funnel inlet. The filaments 52 bend, curl, or loop and move into contact as they accumulate. The filaments 52 slide down the funnel 74 toward the funnel outlet. Each member of the set of filaments 52 may be bonded to at least one other member of the set of filaments 52. Bonds are formed between filaments 52 at the points of contact while openings or voids between filaments 52 are present at other locations where one filament 52 does not contact or bond to another filament 52. The entangled and bonded filaments 52 pass through the funnel outlet of the funnel 74 and enter the cooling tank 76. For convenience in reference, the bonded filaments 52 are referred to as a filament mesh structure 90.

The cooling tank 76 holds a liquid, such as water or a mixture of water and another fluid. The liquid in the cooling tank 76 helps support the entangled and bonded filaments 52 to limit further compacting or consolidation of the filaments 52 into a less open or less porous arrangement and maintains a desired porosity and density of the filament mesh structure 90. Thus, the liquid provides some buoyancy or resistance that can result in additional bending, curling, or looping of the filaments 52 adjacent to the surface of the liquid or within the funnel 74 to further build the filament mesh structure 90. The liquid also cools the filaments 52 when the filaments 52 are in the liquid. For instance, the liquid cools the filaments 52 from the outside to solidify the filaments 52 and prevent the filaments 52 from bonding at additional locations. At this point, the filaments 52 are relatively stiff and no longer in a plastic state and thus generally maintain a shape and are not moldable or reformable without being reheated.

The material handling subsystem 78 transports the filament mesh structure 90 through the cooling tank 76. The material handling subsystem 78 includes various rollers and conveyors that help move the filament mesh structure 90 through the liquid and out of the liquid. In some configurations, a tractor conveyor 92 is provided in the cooling tank 76 to help pull the filament mesh structure 90 away from the funnel 74 and to counter buoyancy of the filaments 52.

One or more other rollers, such as roller 94, keep the filament mesh structure 90 submerged in the liquid and guide the filament mesh structure 90 through the cooling tank 76. For example, the roller 94 may guide the filament mesh structure 90 toward a conveyor belt 96 and shaker table 98 that are disposed outside of the cooling tank 76. The shaker table 98 shakes the filament mesh structure 90 while it is on the conveyor belt 96 to remove liquid. Alternatively or in addition, the filament mesh structure 90 may be squeezed to remove liquid, air may be blown toward the filament mesh structure 90 to remove liquid from the filament mesh structure 90, or both.

The manufacturing system 60 described above is a continuous flow process in which the filament mesh structure 90 is formed as a continuous structure when filament extrusion is not interrupted. Further processing of the filament mesh structure 90 is provided after exiting the cooling tank 76 to cut the filament mesh structure 90 into individual pieces or blanks for individual cushions. Such processing is conducted by a cutting subsystem of the manufacturing system 60. The cutting subsystem may be of any suitable type. For instance, the cutting subsystem may employ a blade, knife, hot knife, saw, fluid jet, or the like to cut the filaments 52 of the filament mesh structure 90 into a blank. The cutting subsystem may also cut a slit in the filament mesh structure 90 that receives a clip as will be discussed in more detail below. In some configurations, the filament mesh structure 90 is molded or shaped prior to cutting, after cutting, or both.

Figure 4:
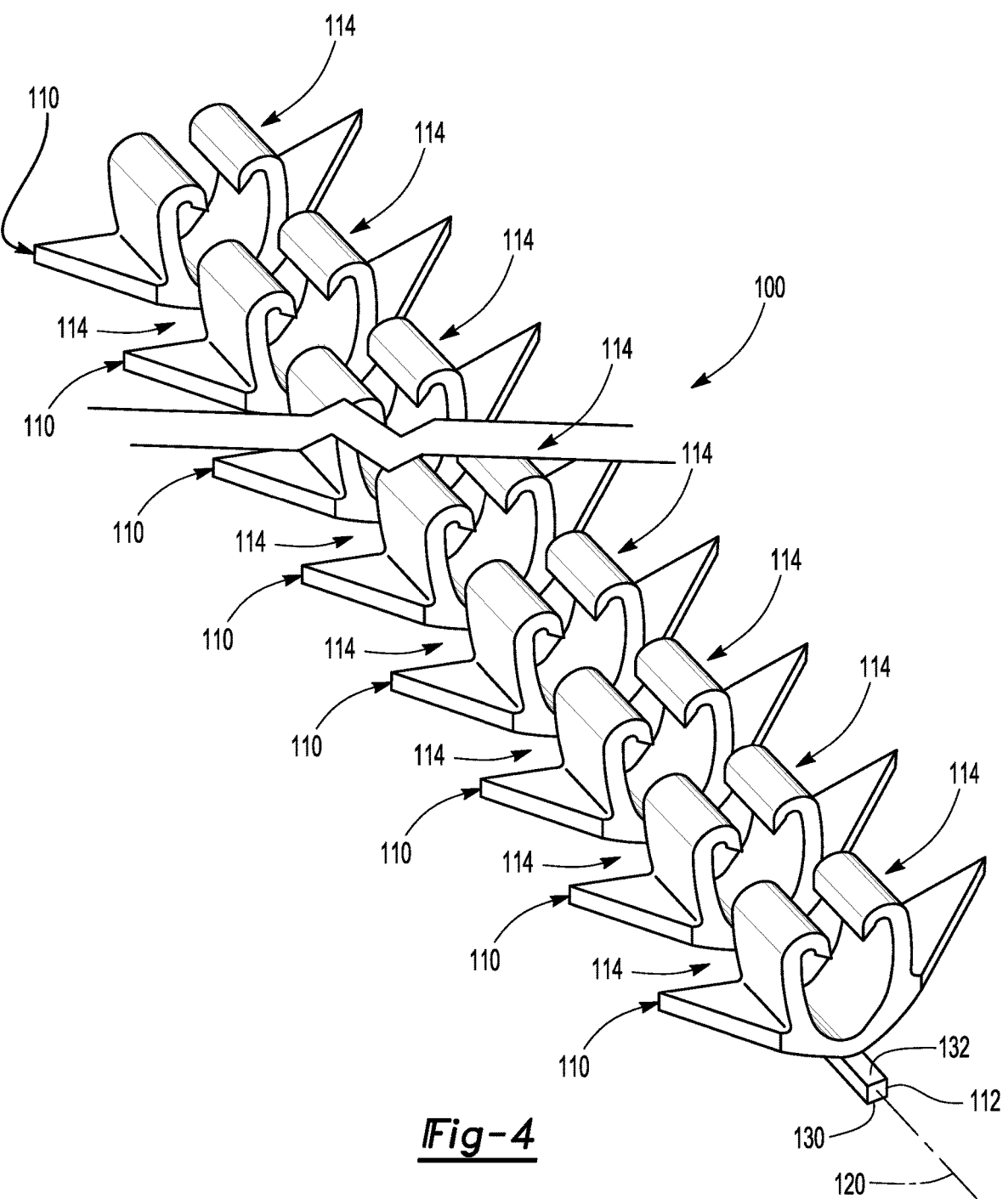
FIG. 4 is a perspective view of an example of a clip.

Referring to FIG. 4, an example of a clip 100 is shown. The clip 100 is configured to secure a trim cover to a cushion, such as a cushion 50 that includes the filament mesh structure 90; however, it is also contemplated that the clip 100 may also be provided with a cushion that includes or is made of foam. For convenience in reference, the trim cover is generically designated with reference number 102 for convenience in reference. The trim cover 102 may be the trim cover 34 of the seat bottom 20 or the trim cover 44 of the seat back 22. An example of a portion of the trim cover 102 is shown in FIG. 12.

With continued reference to FIG. 4, the clip 100 is made of any suitable material or materials. In some configurations, the clip 100 is made of a polymeric material. The clip 100 may be made of the same material as the filaments 52 or a material that differs from the filaments 52. The polymeric material may be recyclable. The clip 100 is manufactured using any suitable process. For instance, the clip 100 may be molded or made with an additive manufacturing process, such as 3D printing. It is contemplated that the clip 100 is manufactured as a unitary one-piece component that may be cut to a suitable length that is installed in the filament mesh structure 90.

The clip 100 includes one or more of clip segments 110. In a configuration having multiple clip segments 110, a spine 112 is provided with the clip 100. In such a configuration, the spine 112 interconnects the clip segments 110. The clip segments 110 are spaced apart from each other such that a gap 114 is provided between one clip segment 110 and an adjacent clip segment 110. The clip 100 will primarily be described in the context of a clip 100 having multiple clip segments 110.

Figures 5, 6, 7, 8:
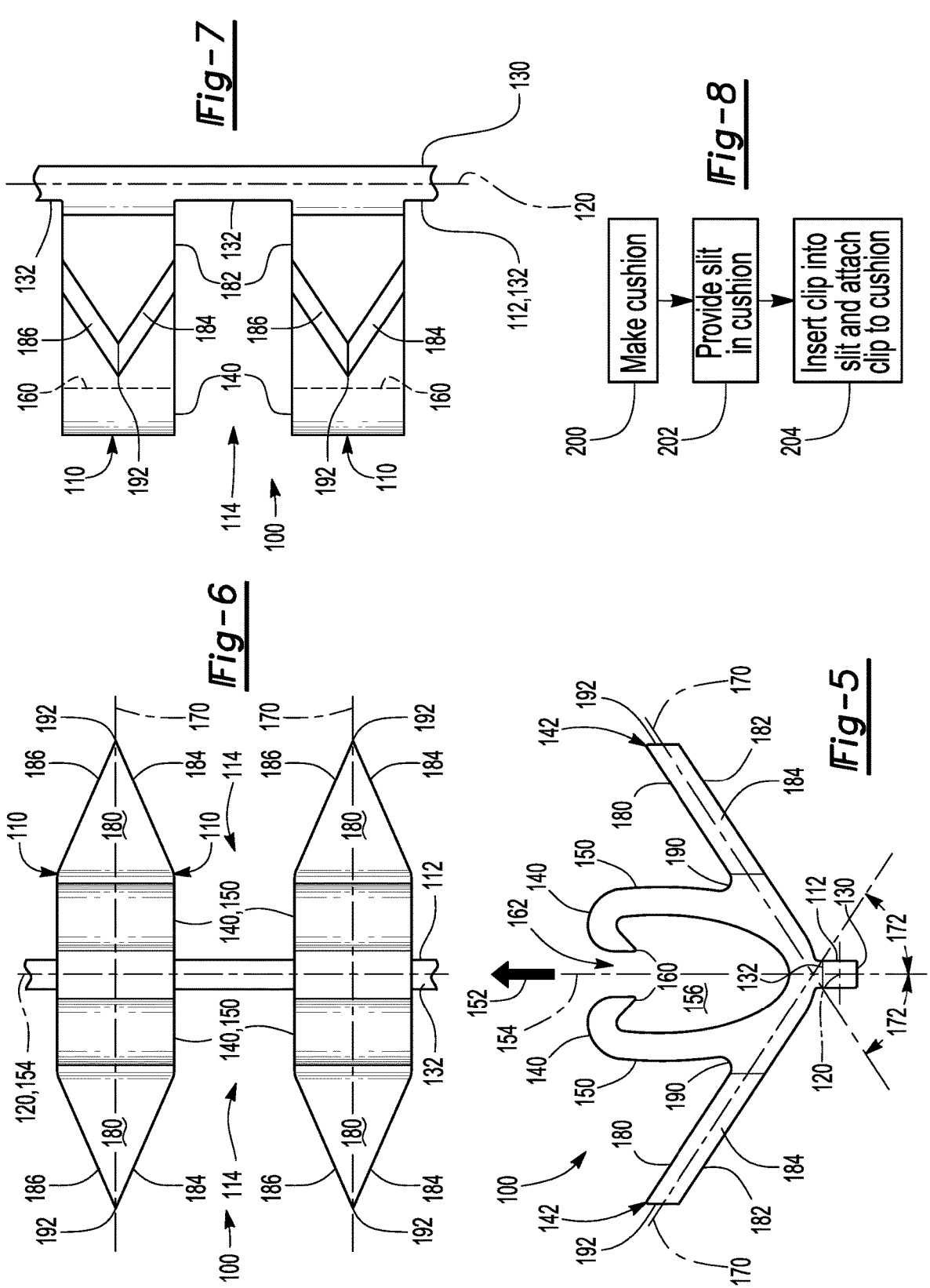
FIG. 5 is an end view of the clip shown in FIG. 4.
FIG. 6 is a plan view of a portion of the clip shown in FIG. 4.
FIG. 7 is a side view of a portion of the clip shown in FIG. 4.
FIG. 8 is a flowchart of a method of manufacture and installation of the clip into the cushion.

Referring to FIGS. 4 and 5, an example of a spine 112 is shown. The spine 112 is flexible and allows the clip segments 110 to be positioned at various orientations with respect to each other as will be discussed in more detail below. The spine 112 may be linear or extend along a linear spine axis 120 when the spine 112 is in a free state such as is shown in FIG. 4. The spine 112 includes a bottom side 130 and a top side 132.

The bottom side 130 faces away from the clip segments 110. In some configurations, the bottom side 130 extends the length of the clip 100.

The top side 132 is disposed opposite the bottom side 130. As such, the top side 132 may face toward the clip segments 110. In some configurations, the top side 132 is segmented and extends from one clip segment 110 to an adjacent clip segment 110 or is visible between adjacent clip segments 110, 110.

In the configuration shown in FIGS. 4 and 5, the spine 112 is positioned below the clip segments 110. It is also contemplated that the spine 112 may be positioned at a higher elevation than is shown in these figures. For instance, the spine 112 may extend from a side of a first clip segment 110 that faces toward an adjacent second clip segment 110 to a corresponding side of the adjacent clip segment 110 that faces toward the first clip segment 110 rather than being disposed below one or more clip segments 110. As an example, the spine 112 may be moved up from the position shown in FIG. 5 such that the top surface 132 in FIG. 5 becomes the bottom surface 130 and the top surface 132 may be hidden behind the clip segment 110 from the perspective shown.

Referring primarily to FIG. 5, a clip segment 110 includes at least one retention feature 140 and at least one barb 142.

The retention feature 140 extends from the spine 112. In some configurations, the retention feature 140 extends from a top side 132 of the spine 112. In the configuration shown in FIG. 5, the clip segment 110 includes a first retention feature 140 and a second retention feature 140. For convenience in reference, the first retention feature 140 may be disposed to the left in FIG. 5 and the second retention feature 140 may be disposed to the right.

The first retention feature 140 and the second retention feature 140 each have an arm 150 that extends away from the spine 112. For instance, an arm 150 may extend away from the spine 112 in a first direction 152 along or with respect to a center plane 154 of the clip segment 110. The center plane 154 may bisect the clip segment 110. In the configuration shown, the center plane 154 is disposed between the first and second retention features 140, 140 or at a location where the first retention feature 140 meets the second retention feature 140. The first direction 152 extends away from the spine 112 or in an upward direction from the perspective shown in FIG. 5. The center plane 154 may extend through the spine 112. For instance, the center plane 154 may bisect the spine 112. The spine axis 120 may be disposed in center plane 154 of a clip segment 110, such as when the clip 100 is in a free state.

The arm 150 of the first retention feature 140 is spaced apart from the arm 150 of the second retention feature 140. As such, the arms 150, 150 cooperate to at least partially define a cavity 156 therebetween.

In some configurations, an arm 150 includes a hook 160 that is provided at a distal end of an arm 150. The hook 160 of the arm 150 of the first retention feature 140 may extend toward the hook 160 of the arm 150 of the second retention feature 140, thereby providing a gap 162 between the hooks 160, 160 that is narrower than an adjacent portion of the cavity 156. The hooks 160, 160 help retain and secure a trim attachment feature of the trim cover 102 in the cavity 156 as will be discussed in more detail below.

One or more barbs 142 are provided with a clip segment 110. A barb 142 extends from a retention feature 140, the spine 112, or both. In FIG. 5, two barbs 142, 142 are shown, with a first barb 142 extending from the first retention feature 140 and a second barb 142 extending from the second retention feature 140. In some configurations, the barbs 142 are spaced apart from and do not extend from the spine 112. In such a configuration, a barb 142 extends from a corresponding retention feature 140 in a direction that extends away from the center plane 154 and the cavity 156. Similarly, a barb that extends from the spine 112 may also extend in a direction that extends away from the center plane 154, the cavity 156, or both.

A barb 142 is disposed in a nonparallel and non-perpendicular relationship with the center plane 154. Moreover, a barb 142 is oriented to extend away from the bottom side 130 of the spine 112, or in an upward direction from the perspective shown in FIG. 5. Thus, a barb 142 extends in the first direction 152 as the distance from the spine 112 increases. As such, a barb 142 may extend further away from the bottom side 130 as the barb 142 extends away from the spine 112 and the center plane 154. In the configuration shown, the first barb 142 extends away from the second barb 142. As such, the first barb 142 and the second barb 142 may extend in opposite directions with respect to each other or with respect to the center plane 154.

A barb 142 may extend away from the bottom side 130 in a linear or nonlinear manner. In FIG. 5, each barb 142 is illustrated as extending along a corresponding barb axis 170. The barb axis 170 intersects the center plane 154 at an acute angle 172 as is shown in FIG. 5 and may be disposed substantially perpendicular to the center plane 154 when viewed from above or in a plan view as is shown in FIG. 6. The term "substantially perpendicular" is used herein to designate features or axes that are the same as or very close to perpendicular and includes features that are within ±3° of being perpendicular each other. In some configurations, the barb axis 170 intersects the center plane 154 at a location that does not intersect the spine 112, such as at a location where the first retention feature 140 meets the second retention feature 140. It is also contemplated that a barb 142 may be curved or extend in a nonlinear manner. For instance, a barb 142 or a portion thereof may extend along an arc or curve that may curve upward from the perspective shown or be convex with respect to the spine 112.

In some configurations, the barb 142 includes an upper side 180, a lower side 182, a first lateral side 184, and a second lateral side 186.

The upper side 180 faces away from the spine 112. In some configurations, the upper side 180 extends from a corresponding retention feature 140. For instance, the upper side 180 may intersect or extend from an arm 150 of a corresponding retention feature 140. The upper side 180 extends further away from the spine 112 as the upper side 180 extends away from a corresponding retention feature 140 from which it extends. The upper side 180 may have a planar or a nonplanar configuration.

The lower side 182 is disposed opposite the upper side 180. As such, the lower side 182 faces toward the spine 112. In some configurations, the lower side 182 extends from a corresponding retention feature 140. In some configurations, the lower side 182 intersects or extends from the spine 112. The lower side 182 may have a planar or nonplanar configuration. The lower side 182 extends further away from the spine 112 as the lower side 182 extends away from a corresponding retention feature 140 from which it extends. In some configurations, the lower side 182 has a greater length than the upper side 180.

In some configurations, the lower side 182 is disposed substantially parallel to the upper side 180. The term "substantially parallel" as used herein means the same as or very close to parallel and includes features or axes that are within ±3° of being parallel each other. The lower side 182 does not intersect the upper side 180 when the lower side 182 is disposed substantially parallel to the upper side 180. In some configurations, the lower side 182 and the upper side 180 are disposed in a nonparallel relationship. For instance, the lower side 182 and the upper side 180 may become closer together as the distance from the center plane 154 increases. It is contemplated in some configurations that the lower side 182 may intersect the upper side 180, such as at a distal end of the barb 142.

Referring to FIGS. 5-7, the first lateral side 184 extends from a corresponding retention feature 140. For example, as is best shown in FIG. 5, the first lateral side 184 may extend from a protrusion 190 of a corresponding retention feature 140 and may be spaced apart from the arm 150 of the retention feature 140. It is also contemplated that the first lateral side 184 or a portion thereof may extend from the arm 150. The first lateral side 184 extends from the upper side 180 to the lower side 182. As is best shown in FIG. 6, the first lateral side 184 extends toward the second lateral side 186 as the distance from the center plane 154 increases. For instance, the first lateral side 184 may extend toward or become closer to a corresponding barb axis 170 as the distance from the center plane 154 increases. It is contemplated that the first lateral side 184 may be planar or nonplanar.

The second lateral side 186 extends from a corresponding retention feature 140 and is disposed opposite the first lateral side 184. For example, the second lateral side 186 may extend from a protrusion 190 of a corresponding retention feature 140 and may be spaced apart from the arm 150 of the retention feature 140. It is also contemplated that the second lateral side 186 or a portion thereof may extend from the arm 150. The second lateral side 186 extends from the upper side 180 to the lower side 182. The second lateral side 186 extends toward the second lateral side 186 as the distance from the center plane 154 increases. For instance, the second lateral side 186 may extend toward or become closer to a corresponding barb axis 170 as the distance from the center plane 154 increases. Such a configuration may facilitate installation of the clip 100 into the cushion 50 as will be discussed in more detail below. It is contemplated that the second lateral side 186 may be planar or nonplanar.

In some configurations, the first lateral side 184 intersects the second lateral side 186 at a distal end 192 of the barb 142. This may result in a barb 142 having a triangular configuration when viewed from above when the first lateral side 184 and the second lateral side 186 have planar configurations that are oriented vertically as is best shown in FIG. 6. It is also contemplated that the distal end 192 may be rounded or provided with a radius rather than meeting along a linear edge.

Referring to FIG. 8, a flowchart is shown of a method of manufacture and installation of the clip 100 into a cushion 50 is shown. The cushion is described in the context of the cushion being a filament mesh structure 90. FIGS. 9-12 provide examples associated with the method steps.

At block 200, the filament mesh structure 90 is manufactured. The filament mesh structure 90 may be manufactured using the manufacturing system 60 as previously discussed. An example of a portion of the filament mesh structure 90 is shown in FIG. 9. FIG. 9 is a simplified representation of the filament mesh structure 90 that does not show individual filaments 52 for simplicity.

At block 202, a slit 210 is provided in the filament mesh structure 90. In some configurations, the slit 210 is provided by the cutting subsystem of the manufacturing system 60 as previously described. As such, the slit 210 may be provided by cutting through some filaments 52 of the filament mesh structure 90. An example of a slit 210 is shown in FIG. 10. The slit 210 extends from a first side 212 of the filament mesh structure 90 toward a second side 214 of the filament mesh structure 90 that is disposed opposite the first side 212. In some configurations, the slit 210 is a partial cut through the thickness of the filament mesh structure 90 and does not extend to the second side 214. In some configurations, the slit 210 is provided by forming an indentation in the filament mesh structure 90 without cutting the filaments 52. For instance, the slit 210 may be provided by molding or reshaping the filament mesh structure 90 to provide a slit 210 like a channel or trench that extends from the first side 212. As an example, the filament mesh structure 90 or a region of the filament mesh structure 90 in which the slit 210 is to be provided may be heated with a fluid (e.g., gas, liquid, or both) to soften the filament mesh structure to allow the softened filaments 52 to conform to the shape of a forming surface of a mold or other tool, such as a rod or bar that is engaged against the first side 212. Alternatively, the fluid may be provided under pressure, such as via one or more nozzles, and may both heat the filaments 52 and exert force on the filaments 52 that is sufficient to form the slit 210. The filament mesh structure 90 may be subsequently cooled to stiffen the filaments 52 and set the shape of the filament mesh structure 90 and the slit 210.

At block 204, the clip 100 is inserted into the slit 210 and attached to the filament mesh structure 90. An example of insertion of the clip 100 is shown in FIG. 11. A tool 220 having an enlarged tip 222, is inserted through the gap 162 between the first and second retention features 140, 140 of the clip 100 toward the bottom of the cavity 156, the gap 162 being best shown in FIG. 5. Force exerted by the tool 220 causes the arms 150, 150 of the first and second retention features 140, 140 to flex away from each other, thereby permitting the enlarged tip 222 to move past the hooks 160, 160 and into the cavity 156 and temporarily secure the clip 100 to the tool 220.

The tool 220 and the clip 100 are aligned with the slit 210. Relative movement between the tool 220 and the filament mesh structure 90 moves the clip 100 into the slit 210, such as by actuating the tool 220 and the clip 100 toward the slit 210, which is represented by the downward pointing arrowed line. The force exerted by the tool 220 is sufficient to cause the clip 100 to enter the slit 210, with the spine 112 entering the slit 210 before the arms 150, 150 enter the slit 210. The clip 100 pushes the filaments 52 apart with the barbs 142, 142 acting like a wedge. The filaments 52 may be sufficiently flexible such that insertion of the clip 100 does not cut or sever the filaments 52.

The clip 100 is inserted to a sufficient depth such that the clip 100 is inserted past the first side 212 of the filament mesh structure 90, or such that the clip 100 is spaced apart from and does not extend from the first side 212. Depending on the configuration of the slit 210, this positioning may allow some filaments 52 to extend over the clip 100. For instance, filaments 52 may be disposed between the first side 212 and the uppermost regions of the arms 150 that are disposed furthest from the spine 112. These filaments 52 may help provide cushioning for an occupant of the cushion so that the presence of the clip 100 is not perceived by the occupant.

In some configurations, the clip 100 is spaced apart from and does not extend to the second side 214 of the filament mesh structure 90 when the clip 100 is installed in the filament mesh structure 90. As a result, the clip 100 does not contact the second side 214.

Insertion of the clip 100 causes the barbs 142 to interact with the filaments 52 such that at least some of the filaments 52 contact a barb 142 and the barb 142 becomes ensnared in the filaments 52 such that the clip 100 is retained in the filament mesh structure 90. At least a portion of a barb 142 is received in a void or gap 230 between members of the set of filaments 52. For clarity, only a few gaps 230 are labeled in FIG. 11. At other locations, the barb 142 contacts one or more members of the set of filaments 52.

Due to the looping or curling of the filaments 52, a filament 52 may contact the clip 100 at various locations. In some configurations, at least one member of the set of filaments 52 contacts the first and second barbs 142, 142 of a clip segment 110. An example of this is filament 52' in FIG. 11. In some configurations, at least one member of the set of filaments 52 contacts at least one retention feature 140 and a barb 142 that extends from the retention feature 140. Filament 52' also provides an example of this configuration; however, it is to be understood that a filament may contact a retention feature and a corresponding barb with or without contacting another retention feature and/or its corresponding barb.

In some configurations, at least one member of the set of filaments 52 contacts more than one clip segment 110. An example of this is shown in FIG. 13. FIG. 13 shows a side view of a first clip segment 110 and a second clip segment 110 inserted into a slit 210 of the filament mesh structure 90, the slit 210 not being clearly visible from the perspective shown. At least one member of the set of filaments 52, such as filament 52" contacts the first clip segment 110 and the second clip segment 110. The first clip segment 110 may be the clip segment furthest left in the second clip segment 110 may be furthest right in FIG. 13. Filament 52" is illustrated as looping or curling around and contacting a barb 142 of the first clip segment 110 and a barb 142 of the second clip segment 110; however, it is to be understood that the filament 52" need not form a closed loop around or encircle one or both barbs 142. For instance, a filament 52 may extend over a barb 142 and engage the upper side 180, may contact another side of a barb 142, or combinations thereof. Some examples, a filament that contacts the lower side 182 of a barb 142 may help limit downward movement or tilting of the clip 100, a filament 52 that contacts a lateral side of a barb 142, such as the first lateral side 184 or the second lateral side 186 may prevent or limit movement of the clip 100 in at least one direction along or within the slit 210.

Once the clip 100 is inserted into the filament mesh structure 90, the tool 220 is disengaged from the clip 100. For instance, relative movement between the tool 220 and the filament mesh structure 90 in a direction opposite that associated with insertion of the clip 100 into the slit 210 causes the arms 150, 150 of the first and second retention features 140, 140 to flex away from each other, thereby permitting the enlarged tip 222 to move past the hooks 160, 160 and out of the cavity 156, thereby disengaging the clip 100. The clip 100 remain secured in the filament mesh structure 90 due to the resistance or retention force provided by the filaments 52 interacting with the clip 100.

Referring to FIG. 12, a simplified representation of the filament mesh structure 90 that does not show individual filaments 52 is shown for simplicity along with the trim cover 102. In some configurations, the trim cover 102 is installed after the clip 100 is inserted into the slit 210 and secured to the filament mesh structure 90. For example, the trim cover 102 may include a trim attachment feature 240 that is inserted through the slit 210 and into the cavity 156. The trim cover 102 may be disposed on or extend across at least a portion of the first side 212 of the filament mesh structure 90. The trim attachment feature 240 extends from the exterior panel or panels of the trim cover 102 through the slit 210 and into the cavity 156.

Insertion of the trim attachment feature 240 through the slit 210 with sufficient force causes the arms 150, 150 of the first and second retention features 140, 140 to flex away from each other, thereby permitting the trim attachment feature 240 to enter the cavity 156.

The trim attachment feature 240 may be shaped in a manner that resists removal of the trim attachment feature 240 from the cavity 156. For instance, the trim attachment feature 240 may have a tapered or arrow-like configuration that is narrower at its tip. The trim attachment feature 240 may be wider closer to the trim cover panels, or may otherwise be configured such that the hooks 160, 160 engage or grasp the trim attachment feature 240 to help retain the trim attachment feature 240 in the cavity 156. It is also contemplated that the trim attachment feature 240 may be inserted into the cavity 156 before the clip 100 is inserted into the filament mesh structure 90.

Figure 14:
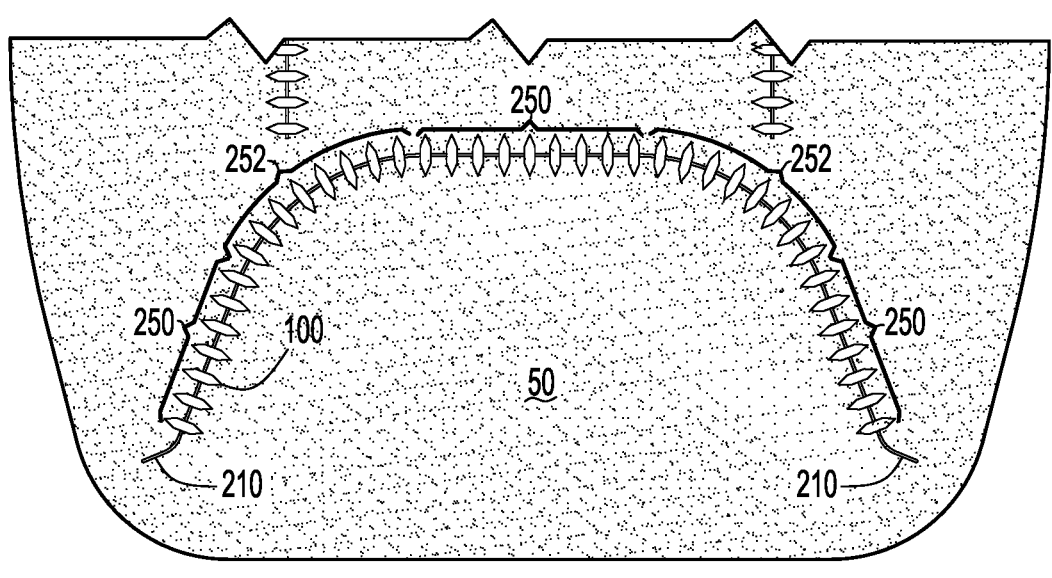
FIG. 14 is a plan view of an example a portion of the filament mesh structure with the clip.

Referring to FIG. 14, a portion of a cushion 50 is shown with a clip 100 received in a slit 210. The slit 210 has examples of linear portions 250 and non-linear portions 252. Non-linear portions 252 extend along an arc or curve. The clip 100 follows the path of the slit 210 when the clip 100 is installed due to the flexibility of the spine 112. As such, at least a portion of the spine 112, such as a portion that is received in a non-linear portion 252 of the slit 210, is nonlinear when the clip 100 and its spine 112 are disposed in the filament mesh structure 90.

Figure 15:
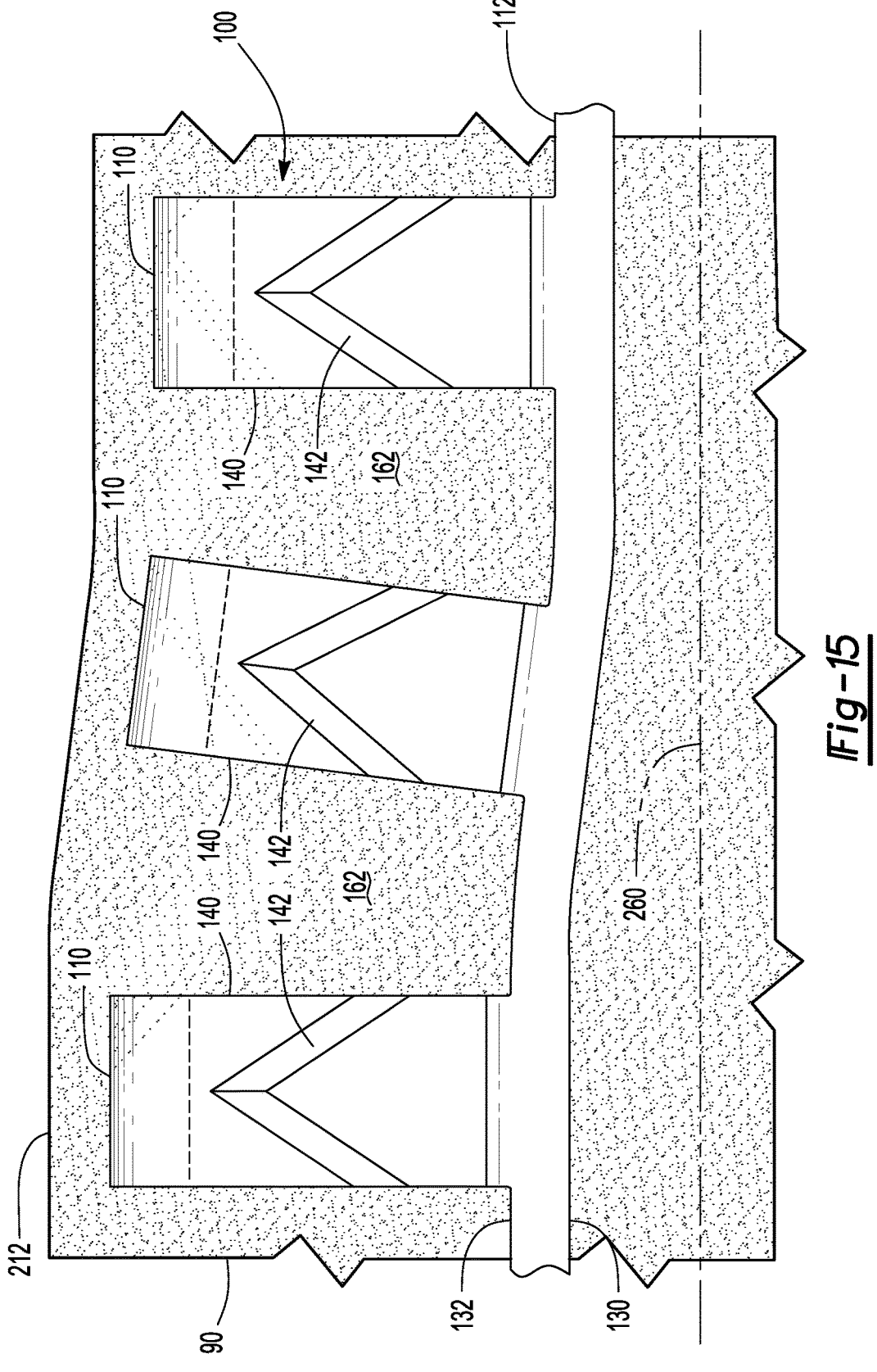
FIG. 15 is a simplified side view of the filament mesh structure illustrating the clip positioned at different elevations in the filament mesh structure.

Referring to FIG. 15, a simplified representation of the filament mesh structure 90 that does not show individual filaments 52 is shown for simplicity along with a portion of the clip 100. The spine 112 is not only flexible along a curved path in a plane but also is flexible out of the plane along a straight or curved path. For example, the spine 112 may extend along an arc such that one or more clip segments 110 are positioned at different elevations in the filament mesh structure 90 with respect to each other. For convenience in reference, the clip segments 110 in FIG. 15 are referred from left to right as a first clip segment, a second clip segment, and a third clip segment.

In this example, the first clip segment is disposed at a higher elevation than the second clip segment, which may position the first clip segment further from the second side 214 than the second clip segment or further from a horizontal reference plane 260 that extends through the cushion than the second clip segment. The horizontal reference plane 260 is a datum or reference plane that may be disposed at or near the center of the cushion, such as at a midpoint between the first side 212 and the second side 214. The second clip segment is illustrated as being a higher elevation than the third clip segment. In addition, the second clip segment is illustrated as being disposed at an angle with respect to the horizontal reference plane 260 and the first and third clip segments. It is also contemplated that adjacent clip segments 110 may be disposed at different elevations but may be disposed in a common relationship with the horizontal reference plane 260. As such, the present invention allows clip segments 110 to be positioned with respect to each other along curved path, straight paths, in different elevations to follow the contour of the cushion and permit clip segments 110 to be positioned at the same or different depths with respect to the first side 212. This possibility may allow the clip segments 110 to be inserted to sufficient depth in the cushion to help maintain occupant comfort while following the contour of the cushion.

Employing the clip as described above with a cushion helps reliably anchor the clip in the cushion, thereby allowing the clip and an associated trim cover to remain in a desired location, which helps keep the trim cover taut and avoids wrinkling or puckering that can provide an undesirable appearance. When employed with a cushion that has a filament mesh structure, the clip can be removed and replaced, thereby facilitating rework and reducing waste.

Clause 1. A clip comprising: a spine comprising a bottom side; first and second retention features extending from the spine; and a first barb extending from at least one of the first retention feature and the spine, wherein the first barb extends away from the bottom side of the spine.

Clause 2. The clip of clause 1 wherein the first and second retention features extend from a top side of the spine, the top side disposed opposite the bottom side of the spine.

Clause 3. The clip of clause 1 or clause 2 further comprising a second barb extending from at least one of the second retention feature and the spine, the second barb extending away from the bottom side of the spine.

Clause 4. The clip of clause 3 wherein the first and second barbs are spaced apart from and do not extend to the spine.

Clause 5. The clip of clause 3 or clause 4 wherein the first barb extends away from the second barb.

Clause 6. The clip of any preceding clause wherein the first barb comprises a first lateral side and a second lateral side, the first and second lateral sides disposed opposite each other and extending from the first retention feature, wherein the first lateral side and the second lateral side become closer together as the first lateral side and the second lateral side extend away from the first retention feature.

Clause 7. The clip of clause 6 wherein the first lateral side intersects the second lateral side at a distal end of the first barb.

Clause 8. The clip of any preceding clause wherein the first barb comprises an upper side and a lower side, the upper side and lower side disposed opposite each other and extend from the first retention feature, wherein the upper side and the lower side extend farther away from the spine as the upper side and the lower side extend away from the first retention feature.

Clause 9. The clip of clause 8 wherein the upper side does not intersect the lower side.

Clause 10. A seat assembly comprising: a filament mesh structure comprising a set of filaments, wherein each member of the set of filaments is looped and bonded to at least one other member of the set of filaments, the filament mesh structure comprising a first side; a trim cover; and a clip disposed in the filament mesh structure, the clip comprising: a spine; and a first clip segment comprising: first and second retention features extending from the spine and securing the trim cover to the clip; and first and second barbs securing the first clip segment to the filament mesh structure wherein the first and second barbs extend away from the spine and toward the first side of the filament mesh structure.

Clause 11. The seat assembly of clause 10 wherein the first barb is received in a gap between members of the set of filaments.

Clause 12. The seat assembly of clause 10 or clause 11 wherein a member of the set of filaments contacts the first and second barbs of the first clip segment.

Clause 13. The seat assembly of any one of clauses 10 to 12 wherein a member of the set of filaments contacts the first barb and the first retention feature of the first clip segment.

Clause 14. The seat assembly of any one of clauses 10 to 13 wherein the first and second barbs extend from the first and second retention features, respectively.

Clause 15. The seat assembly of any one of clauses 10 to 14 wherein the filament mesh structure further comprises a slit that extends from the first side, wherein the clip is disposed in the slit and is spaced apart from and does not extend to the first side.

Clause 16. The seat assembly of clause 15 wherein the filament mesh structure further comprises a second side that is disposed opposite the first side, wherein the slit and the clip are spaced apart from and do not extend to the second side.

Clause 17. The seat assembly of any one of clauses 10 to 16 wherein the spine is linear when the spine is in a free state and at least a portion of the spine is nonlinear when the spine is disposed in the filament mesh structure.

Clause 18. The seat assembly of any one of clauses 10 to 17 wherein the clip further comprises a second clip segment extending from the spine and separated from the first clip segment.

Clause 19. The seat assembly of clause 17 wherein a member of the set of filaments contacts the first clip segment and the second clip segment.

Clause 20. The seat assembly of clause 18 or clause 19 wherein the spine extends along an arc such that the first clip segment and the second clip segment are positioned at different elevations in the filament mesh structure with respect to each other.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. An assembly, comprising:
a filament mesh structure comprising a set of filaments; and
a clip comprising:
a spine comprising a bottom side;
a first retention feature and a second retention feature extending from the spine; and
a first barb and a second barb extending from at least one of the first retention feature and the spine, wherein the first barb and the second barb extends away from the bottom side of the spine, wherein a member of the set of filaments contacts the first barb and the second barb.

2. The assembly of claim 1, wherein the first retention feature and the second retention feature extend from a top side of the spine, wherein the top side is disposed opposite the bottom side of the spine.

3. The assembly of claim 1, further comprising a second barb extending from at least one of the second retention feature and the spine, and wherein the second barb extending away from the bottom side of the spine.

4. The assembly of claim 3, wherein the first barb and the second barb are spaced apart from the spine and do not extend to the spine.

5. The assembly of claim 3, wherein the first barb extends away from the second barb.

6. The assembly of claim 1, wherein the first barb comprises a first lateral side and a second lateral side, the first lateral side and the second lateral side are disposed opposite each other and extending from the first retention feature, wherein the first lateral side and the second lateral side become closer together as the first lateral side and the second lateral side extend away from the first retention feature.

7. The assembly of claim 6, wherein the first lateral side intersects the second lateral side at a distal end of the first barb.

8. The assembly of claim 1, wherein the first barb comprises an upper side and a lower side, the upper side and lower side disposed opposite each other and extend from the first retention feature, wherein the upper side and the lower side extend farther away from the spine as the upper side and the lower side extend away from the first retention feature.

9. The assembly of claim 8, wherein the upper side does not intersect the lower side.

10. The assembly of claim 1, wherein the clip comprises a plurality of clip segments and the spine is configured to interconnect the plurality of clip segments.

11. A seat assembly, comprising:
a filament mesh structure comprising a set of filaments, wherein each member of the set of filaments is looped and bonded to at least one other member of the set of filaments, the filament mesh structure comprising a first side;
a trim cover; and
a clip disposed in the filament mesh structure, the clip comprising:
a spine; and
a first clip segment comprising:
a first retention feature and a second retention feature extending from the spine and securing the trim cover to the clip; and
a first barb and a second barb configured to secure the first clip segment to the filament mesh structure, wherein the first barb and the second barb extend away from the spine and toward the first side of the filament mesh structure, and wherein a member of the set of filaments contacts the first barb and the second barb of the first clip segment.

12. The seat assembly of claim 11, wherein the first barb is received in a gap between members of the set of filaments.

13. The seat assembly of claim 11, wherein a member of the set of filaments contacts the first barb and the first retention feature of the first clip segment.

14. The seat assembly of claim 11, wherein the first barb and the second barb extend from the first retention feature and the second retention feature, respectively.

15. The seat assembly of claim 11, wherein the filament mesh structure further comprises a slit that extends from the first side, wherein the clip is disposed in the slit and is spaced apart from the first side and does not extend to the first side.

16. The seat assembly of claim 15, wherein the filament mesh structure further comprises a second side that is disposed opposite the first side, wherein the slit and the clip are spaced apart from the second side and do not extend to the second side.

17. The seat assembly of claim 11, wherein the spine is linear when the spine is in a free state and at least a portion of the spine is nonlinear when the spine is disposed in the filament mesh structure.

18. The seat assembly of claim 11, wherein the clip further comprises a second clip segment extending from the spine and separated from the first clip segment.

19. The seat assembly of claim 18, wherein a member of the set of filaments contacts the first clip segment and the second clip segment.

20. The seat assembly of claim 18, wherein the spine extends along an arc such that the first clip segment and the second clip segment are positioned at different elevations in the filament mesh structure with respect to each other.

* * * * *